US010951874B2

(12) United States Patent
Chen et al.

(10) Patent No.: US 10,951,874 B2
(45) Date of Patent: Mar. 16, 2021

(54) INCREMENTAL QUALITY DELIVERY AND COMPOSITING PROCESSING

(71) Applicant: MEDIATEK INC., Hsin-Chu (TW)

(72) Inventors: Lulin Chen, Elk Grove, CA (US);
Shan Liu, San Jose, CA (US); Xin Wang, Rancho Palos Verdes, CA (US);
Wang-Lin Lai, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/328,382

(22) PCT Filed: Sep. 1, 2017

(86) PCT No.: PCT/CN2017/100150
§ 371 (c)(1),
(2) Date: Feb. 26, 2019

(87) PCT Pub. No.: WO2018/041244
PCT Pub. Date: Mar. 8, 2018

(65) Prior Publication Data
US 2019/0364259 A1    Nov. 28, 2019

Related U.S. Application Data

(60) Provisional application No. 62/444,884, filed on Jan. 11, 2017, provisional application No. 62/444,889, (Continued)

(51) Int. Cl.
*H04N 13/161* (2018.01)
*H04N 19/33* (2014.01)
(Continued)

(52) U.S. Cl.
CPC ......... *H04N 13/161* (2018.05); *H04N 13/139* (2018.05); *H04N 13/178* (2018.05); *H04N 19/33* (2014.11); *H04N 19/593* (2014.11)

(58) Field of Classification Search
CPC ....... H04N 21/26208; H04N 21/26216; H04N 21/26616; H04N 21/41407;
(Continued)

(56) References Cited

U.S. PATENT DOCUMENTS

| 2016/0191929 | A1* | 6/2016 | Hwang ................. H04N 19/30 |
| | | | 725/110 |
| 2017/0223368 | A1* | 8/2017 | Abbas .................... H04N 19/59 |
| 2018/0242028 | A1* | 8/2018 | Van Brandenburg ...................... |
| | | | H04N 21/8456 |

FOREIGN PATENT DOCUMENTS

| CN | 101960845 A | 1/2011 |
| CN | 103179405 A | 6/2013 |

(Continued)

OTHER PUBLICATIONS

International Search Report dated Nov. 29, 2017, issued in application No. PCT/CN2017/100150.
(Continued)

*Primary Examiner* — Dave Czekaj
*Assistant Examiner* — Samuel D Fereja
(74) *Attorney, Agent, or Firm* — Wolf, Greenfield & Sacks, P.C.

(57) ABSTRACT

A media content delivery apparatus that encodes media content as multiple spatial objects is provided. The media content delivery apparatus encodes a first spatial object according to a first set of parameters. The media content delivery apparatus also encodes a second spatial object according to a second set of parameters. The first and second spatial objects are encoded independently. The media content delivery apparatus also generates a metadata based on the first set of parameters, the second set of parameters, and a relationship between the first and second spatial objects. The media content delivery apparatus then transmits or
(Continued)

stores the encoded first spatial object, the encoded second spatial object, and the generated metadata.

19 Claims, 21 Drawing Sheets

Related U.S. Application Data filed on Jan. 11, 2017, provisional application No. 62/436,010, filed on Dec. 19, 2016, provisional application No. 62/385,297, filed on Sep. 9, 2016, provisional application No. 62/382,807, filed on Sep. 2, 2016.

(51) Int. Cl.
*H04N 19/593* (2014.01)
*H04N 13/178* (2018.01)
*H04N 13/139* (2018.01)

(58) Field of Classification Search
CPC .......... H04N 21/4305; H04N 21/4316; H04N 21/432; H04N 21/4331; H04N 21/4344; H04N 21/4348; H04N 21/4349; H04N 21/4355; H04N 21/43615; H04N 21/4363; H04N 21/4381; H04N 21/44029; H04N 21/4424; H04N 21/462; H04N 21/47202; H04N 21/4825; H04N 21/6131; H04N 21/631; H04N 21/6332; H04N 21/643; H04N 21/6437; H04N 21/64707; H04N 21/658; H04N 21/8106; H04N 21/8453; H04N 21/85; H04N 21/854; H04N 2213/007; H04N 5/232; H04N 5/247; H04N 5/2628; H04N 5/265; H04N 5/76; H04N 5/765; H04N 5/91; H04N 5/919; H04N 7/0117; H04N 7/0127; H04N 7/15; H04N 7/152; H04N 7/26335; H04N 7/26941; H04N 7/50; H04N 9/8042; H04N 9/8205; H04L 65/607; H04L 65/608; H04L 67/02; H04L 65/4084; H04L 65/602; H04L 65/4069; H04L 65/601; H04L 65/604; H04L 65/80
See application file for complete search history.

(56) References Cited

FOREIGN PATENT DOCUMENTS

| JP | 2000-209590 A | 7/2000 |
| JP | 2011-228929 A | 11/2011 |
| TW | 200822759 A | 5/2008 |
| WO | 2008/007304 A2 | 1/2008 |
| WO | 2009/112918 A1 | 9/2009 |

OTHER PUBLICATIONS

Li, H.; "Research on Object-based Video Coding Techniques Chinese Doctoral Dissertations & Master's Theses Full-text Database (Master);" Mar. 15, 2006; pp. 1-60.
English language translation of abstract of "Research on Object-based Video Coding Techniques Chinese Doctoral Dissertations & Master's Theses Full-text Database (Master);" Mar. 2006; pp. 1.

\* cited by examiner

```xml
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">

<Period>
    <!-- Presence and relationship of base and incremental quality layers-->
    <EssentialProperty schemeIdUri="urn:mpeg:dash:vr-incremental:2016"
      value="A1 B1M, I1M, B3M, I3M, B5M, I5M 2"/>
    <SegmentBase timescale="50"/>

<!-- Base quality content -->
    <AdaptationSet id="A1" segmentAlignment="true"
subsegmentAlignment="true" subsegmentStartsWithSAP="1">
      <EssentialProperty schemeIdUri="urn:mpeg:dash:srd:2014"
        value="1, 0, 0, 3840, 2160, 3840, 2160, 0"/>
      <Switching interval="150"/>
      <Representation id="B1M" mimeType="video/mp4" codecs="avc1.42c01e"
bandwidth="1000000" width="1920" height="1080">
        <BaseURL>base_quality1M.mp4</BaseURL>
      </Representation>
      <Representation id="B3M" mimeType="video/mp4" codecs="avc1.42c01e"
bandwidth="3000000" width="1920" height="1080">
        <BaseURL>base_quality3M.mp4</BaseURL>
      </Representation>
      <Representation id="B5M" mimeType="video/mp4" codecs="avc1.42c01e"
bandwidth="5000000" width="1920" height="1080">
        <BaseURL>base_quality5M.mp4</BaseURL>
      </Representation>
    </AdaptationSet>

<!-- Incremental quality content for the 1M base quality content -->
    <AdaptationSet id="I1M" segmentAlignment="true"
subsegmentAlignment="true" subsegmentStartsWithSAP="1">
      <SupplementalProperty schemeIdUri="urn:mpeg:dash:srd:2014"
        value="1, 0, 0, 3840, 2160, 3840, 2160, 0"/>
      <Switching interval="50"/>
      <Representation id="256k" mimeType="video/mp4" codecs="avc1.42c033"
bandwidth="256000" width="3840" height="2160">
        <BaseURL>incremental1M256.mp4</BaseURL>
      </Representation>
      <Representation id="512k" mimeType="video/mp4" codecs="avc1.42c033"
bandwidth="512000" width="3840" height="2160">
        <BaseURL>incremental1M512.mp4</BaseURL>
      </Representation>
      <Representation id="768k" mimeType="video/mp4" codecs="avc1.42c033"
bandwidth="768000" width="3840" height="2160">
        <BaseURL>incremental1M768.mp4</BaseURL>
      </Representation>
    </AdaptationSet>
```

*Figure 9a*

```xml
<!-- Incremental quality content for the 3M base quality content -->
    <AdaptationSet id="I3M" segmentAlignment="true" subsegmentAlignment="true"
subsegmentStartsWithSAP="1">
        <SupplementalProperty schemeIdUri="urn:mpeg:dash:srd:2014"
        value="1, 0, 0, 3840, 2160, 3840, 2160, 0"/>
        <Switching interval="25"/>
        <Representation id="256k" mimeType="video/mp4" codecs="avc1.42c033"
bandwidth="256000" width="3840" height="2160">
            <BaseURL>incremental3M256.mp4</BaseURL>
        </Representation>
        <Representation id="512k" mimeType="video/mp4" codecs="avc1.42c033"
bandwidth="512000" width="3840" height="2160">
            <BaseURL>incremental3M512.mp4</BaseURL>
        </Representation>
        <Representation id="768k" mimeType="video/mp4" codecs="avc1.42c033"
bandwidth="768000" width="3840" height="2160">
            <BaseURL>incremental3M768.mp4</BaseURL>
        </Representation>
    </AdaptationSet>

<!-- Incremental quality content for the 5M base quality content -->
    <AdaptationSet id="I5M" segmentAlignment="true" subsegmentAlignment="true"
subsegmentStartsWithSAP="1">
        <SupplementalProperty schemeIdUri="urn:mpeg:dash:srd:2014"
        value="1, 0, 0, 3840, 2160, 3840, 2160, 0"/>
        <Switching interval="1"/>
        <Representation id="256k" mimeType="video/mp4" codecs="avc1.42c033"
bandwidth="256000" width="3840" height="2160">
            <BaseURL>incremental5M256.mp4</BaseURL>
        </Representation>
        <Representation id="500k" mimeType="video/mp4" codecs="avc1.42c033"
bandwidth="512000" width="3840" height="2160">
            <BaseURL>incremental5M512.mp4</BaseURL>
        </Representation>
        <Representation id="750k" mimeType="video/mp4" codecs="avc1.42c033"
bandwidth="768000" width="3840" height="2160">
            <BaseURL>incremental5M768.mp4</BaseURL>
        </Representation>
    </AdaptationSet>

</Period>
</MPD>
```

900

*Figure 9b*

```xml
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">

<Period>
    <!-- Presence and relationship of base and incremental quality layers-->
    <EssentialProperty schemeIdUri="urn:mpeg:dash:vr-incremental:2016"
      value="A1 B1M, I1M, B3M, I3M, B5M, I5M 2"/>
    <SegmentBase timescale="50"/>

<!-- Base quality content -->

<!-- Incremental quality content for the 5M base quality content -->
    <!--4 HEVC Tile Tracks in a single MP4 File -->
    <AdaptationSet id="I5M" segmentAlignment="true"
      subsegmentAlignment="true" subsegmentStartsWithSAP="1"
      mimeType="video/mp4" codecs="hvc2.1.2.H120.B0"
      width="3840" height="2160" [...] >
      <SupplementalProperty schemeIdUri="urn:mpeg:dash:srd:2014"
        value="1, 0, 0, 3840, 2160, 3840, 2160, 0"/>
      <Switching interval="1"/>
      <Representation id="0" bandwidth="2048000"[...]>
        <BaseURL>incremenatI5M-HEVCtile.mp4</BaseURL>
        <SubRepresentation
          level="1" dependencyLevel="0" bandwidth="512000"
          codecs="hvt1.1.2.H93.B0" width="1920" height="1080" [...]>
          <EssentialProperty schemeIdUri="urn:mpeg:dash:srd:2014"
            value="1, 0, 0, 1920, 1080, 3840, 2160"/>
        </SubRepresentation>
        <SubRepresentation
          level="2" dependencyLevel="0" bandwidth="512000"
          codecs="hvt1.1.2.H93.B0" width="960" height="540" [...]>
          <EssentialProperty schemeIdUri="urn:mpeg:dash:srd:2014"
            value="1, 1920, 0, 1920, 1080"/>
        </SubRepresentation>
        <SubRepresentation
          level="3" dependencyLevel="0" bandwidth="512000"
          codecs="hvt1.1.2.H93.B0" width="1920" height="1080" [...]>
          <EssentialProperty schemeIdUri="urn:mpeg:dash:srd:2014"
            value="1, 0, 1080, 1920, 1080"/>
        </SubRepresentation>
        <SubRepresentation
          level="4" dependencyLevel="0" bandwidth="512000"
          codecs="hvt1.1.2.H93.B0" width="1920" height="1080" [...]>
          <EssentialProperty schemeIdUri="urn:mpeg:dash:srd:2014"
            value="1, 1920, 1080, 1920, 1080"/>
        </SubRepresentation>
      </Representation>
    </AdaptationSet>

</Period>
</MPD>
```

*Figure 10*

```xml
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!-- Presence and relationship of base and incremental quality layers-->
    <EssentialProperty schemeIdUri=" urn:mpeg:dash:vr-baseinc:2017"
      value="A1 CMP2X3, I1, ERP 2"/>
    <SegmentBase timescale="50"/>

<!-- Base quality layer data -->
    <AdaptationSet id="A1" segmentAlignment="true" subsegmentAlignment="true"
subsegmentStartsWithSAP="1">
        <EssentialProperty schemeIdUri="urn:mpeg:dash:srd:2014"
          value="1, 0, 0, 3840, 2160, 3840, 2160, 0"/>
        <Switching interval="150"/>
        <Representation id="B1M" mimeType="video/mp4" codecs="avc1.42c01e"
bandwidth="1000000" width="1920" height="1080">
          <BaseURL>base_quality1M.mp4</BaseURL>
        </Representation>
        <Representation id="B3M" mimeType="video/mp4" codecs="avc1.42c01e"
bandwidth="3000000" width="1920" height="1080">
          <BaseURL>base_quality3M.mp4</BaseURL>
        </Representation>
        <Representation id="B5M" mimeType="video/mp4" codecs="avc1.42c01e"
bandwidth="5000000" width="1920" height="1080">
          <BaseURL>base_quality5M.mp4</BaseURL>
        </Representation>
    </AdaptationSet>

<!-- Incremental quality layer -->
    <AdaptationSet id="I1" segmentAlignment="true" subsegmentAlignment="true"
subsegmentStartsWithSAP="1">
        <SupplementalProperty schemeIdUri="urn:mpeg:dash:srd:2014"
          value="1, 0, 0, 3840, 2160, 3840, 2160, 0"/>
        <Switching interval="25"/>
        <Representation id="256k" mimeType="video/mp4" codecs="avc1.42c033"
bandwidth="256000" width="3840" height="2160">
          <BaseURL>incremental1M256.mp4</BaseURL>
        </Representation>
        <Representation id="512k" mimeType="video/mp4" codecs="avc1.42c033"
bandwidth="512000" width="3840" height="2160">
          <BaseURL>incremental1M512.mp4</BaseURL>
        </Representation>
        <Representation id="768k" mimeType="video/mp4" codecs="avc1.42c033"
bandwidth="768000" width="3840" height="2160">
          <BaseURL>incremental1M768.mp4</BaseURL>
        </Representation>
    </AdaptationSet>
    </AdaptationSet>
  </Period>
</MPD>
```

*Figure 11*

```
aligned(8) class 2DCartesianCoordinatesSampleBlending(){
  unsigned int(16) top_left_x;
  unsigned int(16) top_left_y;
  unsigned int(16) width;
  unsigned int(16) height;
  unsigned int(1) interpolate;
  unsigned int(1) blend;
  unsigned int(6) reserved;
  if(blend == 1) {
    unsigned int(8) blending_mode;
    unsigned int(8) reserved[];
  }
}
```

*Figure 12*

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!-- Main video -->
    <AdaptationSet segmentAlignment="true" subsegmentAlignment="true"
subsegmentStartsWithSAP="1">
      <Role schemeIdUri="urn:mpeg:dash:role:2011" value="main"/>
      <SupplementalProperty schemeIdUri="urn:mpeg:dash:srd:2014"
      value="1, 0, 0, 3840, 2160, 3840, 2160, 0"/>
      <Representation id="panorama" mimeType="video/mp4"
codecs="avc1.42c033" bandwidth="12000000" width="3840" height="2160">
<BaseURL>panorama.mp4</BaseURL>
      </Representation>
    </AdaptationSet>

<!-- Moving Region-of-Interest -->
    <AdaptationSet segmentAlignment="true" subsegmentAlignment="true"
subsegmentStartsWithSAP="1">
      <EssentialProperty schemeIdUri="urn:mpeg:dash:srd:dynamic:2016"
      value="1, roi-coordinates"/>
      <Representation id="movingROI" mimeType="video/mp4"
codecs="avc1.42c01e" bandwidth="5000000" width="1920" height="1080">
        <BaseURL>moving_ROI.mp4</BaseURL>
      </Representation>
    </AdaptationSet>
    <AdaptationSet segmentAlignment="true" subsegmentAlignment="true"
subsegmentStartsWithSAP="1">
      <Representation id="roi-coordinates" associationId="movingROI"
associationType="cdsc" codecs="2dcc" bandwidth="100">
        <BaseURL>roi_coordinates_blending.mp4</BaseURL>
      </Representation>
    </AdaptationSet>
  </Period>
</MPD>
```

*Figure 13*

```
aligned(8) class Blending2DCartesianCoordinatesSample(){
    unsigned int(8) blending_mode;
    unsigned int(8) reserved[];
    2DCartesianCoordinatesSample 2dccsample; // optional
}
```

Figure 14

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
    <!-- Main video -->
    <AdaptationSet segmentAlignment="true" subsegmentAlignment="true"
subsegmentStartsWithSAP="1">
      <Role schemeIdUri="urn:mpeg:dash:role:2011" value="main"/>
      <SupplementalProperty schemeIdUri="urn:mpeg:dash:srd:2014"
value="1, 0, 0, 3840, 2160, 3840, 2160, 0"/>
      <Representation id="panorama" mimeType="video/mp4"
codecs="avc1.42c033" bandwidth="12000000" width="3840" height="2160">
        <BaseURL>panorama.mp4</BaseURL>
      </Representation>
    </AdaptationSet>

<!-- Moving Region-of-Interest -->
    <AdaptationSet segmentAlignment="true" subsegmentAlignment="true"
subsegmentStartsWithSAP="1">
      <EssentialProperty schemeIdUri="urn:mpeg:dash:srd:dynamic:2016"
value="1, roi-coordinates"/>
      <Representation id="movingROI" mimeType="video/mp4"
codecs="avc1.42c01e" bandwidth="5000000" width="1920" height="1080">
        <BaseURL>moving_ROI.mp4</BaseURL>
      </Representation>
    </AdaptationSet>
    <AdaptationSet segmentAlignment="true" subsegmentAlignment="true"
subsegmentStartsWithSAP="1">
      <Representation id="roi-coordinates" associationId="movingROI"
associationType="cdsc" codecs="2dcc" bandwidth="100">
        <BaseURL>roi_coordinates.mp4</BaseURL>
      </Representation>
    </AdaptationSet>
    <AdaptationSet segmentAlignment="true" subsegmentAlignment="true"
subsegmentStartsWithSAP="1">
      <Representation id="roi-coordinates" associationId="movingROI"
associationType="cdsc" codecs="2dcc" bandwidth="100">
        <BaseURL>blending_roi_coordinates.mp4</BaseURL>
      </Representation>
    </AdaptationSet>
  </Period>
</MPD>
```

Figure 15

```xml
<?xml version="1.0" encoding="UTF-8"?>
<MPD
  xmlns="urn:mpeg:dash:schema:mpd:2011" type="static"
  mediaPresentationDuration="PT10S" minBufferTime="PT1S"
  profiles="urn:mpeg:dash:profile:isoff-on-demand:2011">

<Period>
    <!-- Tiled Panorama (2 full HD video next to each other) -->
    <AdaptationSet segmentAlignment="true" subsegmentAlignment="true"
subsegmentStartsWithSAP="1">
      <Role schemeIdUri="urn:mpeg:dash:role:2011" value="main"/>
      <SupplementalProperty schemeIdUri= "urn:mpeg:dash:srd:simul:2017"
      <Viewpoint schemeIdUri="urn:mpeg:dash:viewpoint:2011" value="vp1"/>
      value="1, 0, 0, 1920, 1080, 3840, 1080, 0"/>
      <Representation id="left_panorama" mimeType="video/mp4" codecs="avc1.42c01e"
bandwidth="5000000" width="1920" height="1080">
        <BaseURL>left_panorama.mp4</BaseURL>
      </Representation>
    </AdaptationSet>

<AdaptationSet segmentAlignment="true" subsegmentAlignment="true"
subsegmentStartsWithSAP="1">
      <SupplementalProperty schemeIdUri="urn:mpeg:dash:srd:simul:2017"
      <Viewpoint schemeIdUri="urn:mpeg:dash:viewpoint:2011" value="vp1"/>
      value="1, 1920, 0, 1920, 1080, 3840, 1080, 0"/>
      <Representation id="right_panorama" mimeType="video/mp4" codecs="avc1.42c01e"
bandwidth="5000000" width="1920" height="1080">
        <BaseURL>right_panorama.mp4</BaseURL>
      </Representation>
    </AdaptationSet>

<!-- Moving Region-of-interest -->
    <AdaptationSet segmentAlignment="true" subsegmentAlignment="true"
subsegmentStartsWithSAP="1">
      <EssentialProperty schemeIdUri="urn:mpeg:dash:srd:simul:2017"
      <Viewpoint schemeIdUri="urn:mpeg:dash:viewpoint:2011" value="vp1"/>
      value="1, roi-coordinates"/>
      <Representation id="zoomed" mimeType="video/mp4" codecs="avc1.42c01e"
bandwidth="5000000" width="1920" height="1080">
        <BaseURL>zoomed_part.mp4</BaseURL>
      </Representation>
    </AdaptationSet>

<AdaptationSet segmentAlignment="true" subsegmentAlignment="true"
subsegmentStartsWithSAP="1">
      <Representation id="roi-coordinates" associationId="zoomed"
associationType="cdsc" codecs="2dcc" bandwidth="100">
        <BaseURL>roi_coordinates.mp4</BaseURL>
      </Representation>
    </AdaptationSet>

</Period>
</MPD>
```

```xml
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">

<ProgramInformation>
    <Title>Example of a DASH Media Presentation Description using Spatial Relationship Description to indicate tiles of a video</Title>
  </ProgramInformation>

<Period>
    <!-- Main Video -->
    <AdaptationSet segmentAlignment="true" subsegmentAlignment="true" subsegmentStartsWithSAP="1">
      <Role schemeIdUri="urn:mpeg:dash:role:2011" value="main"/>
      <SupplementalProperty schemeIdUri="urn:mpeg:dash:srd:2014" value="0,0,0,2,2,2,2"/>
      <Representation mimeType="video/mp4" codecs="avc1.42c01e" width="640" height="360" bandwidth="226597" startWithSAP="1">
        <BaseURL> full_video_small.mp4</BaseURL>
        <SegmentBase indexRangeExact="true" indexRange="837-988"/>
      </Representation>
      <Representation mimeType="video/mp4" codecs="avc1.42c01f" width="1280" height="720" bandwidth="553833" startWithSAP="1">
        <BaseURL> full_video_hd.mp4</BaseURL>
        <SegmentBase indexRangeExact="true" indexRange="838-989"/>
      </Representation>
      <Representation mimeType="video/mp4" codecs="avc1.42c033" width="3840" height="2160" bandwidth="1055223" startWithSAP="1">
        <BaseURL> full_video_4k.mp4</BaseURL>
        <SegmentBase indexRangeExact="true" indexRange="839-990"/>
      </Representation>
    </AdaptationSet>
```

```xml
<!-- Tile 1 -->
    <AdaptationSet segmentAlignment="true" subsegmentAlignment="true"
subsegmentStartsWithSAP="1">
      <SupplementalProperty
schemeIdUri="urn:mpeg:dash:sai:spatial:2017" value="1"/>
      <SupplementalProperty schemeIdUri="urn:mpeg:dash:srd:simul:2017"
value="0,0,0,1,1,2,2"/>
      <Representation mimeType="video/mp4" codecs="avc1.42c00d"
width="640" height="360" bandwidth="218284" startWithSAP="1">
        <BaseURL> tile1_video_small.mp4</BaseURL>
        <SegmentBase indexRangeExact="true" indexRange="837-988"/>
      </Representation>
      <Representation mimeType="video/mp4" codecs="avc1.42c01f"
width="1280" height="720" bandwidth="525609" startWithSAP="1">
        <BaseURL> tile1_video_hd.mp4</BaseURL>
        <SegmentBase indexRangeExact="true" indexRange="838-989"/>
      </Representation>
      <Representation mimeType="video/mp4" codecs="avc1.42c028"
width="1920" height="1080" bandwidth="769514" startWithSAP="1">
        <BaseURL> tile1_video_fullhd.mp4</BaseURL>
        <SegmentBase indexRangeExact="true" indexRange="839-990"/>
      </Representation>
    </AdaptationSet>
<!-- Tile 2 -->
    <AdaptationSet segmentAlignment="true" subsegmentAlignment="true"
subsegmentStartsWithSAP="1">
      <SupplementalProperty
schemeIdUri="urn:mpeg:dash:sai:spatial:2017" value="1"/>
      <SupplementalProperty schemeIdUri="urn:mpeg:dash:srd:simul:2017"
value="0,1,0,1,1,2,2"/>
      ...
    </AdaptationSet>
<!-- Tile 3 -->
    <AdaptationSet segmentAlignment="true" subsegmentAlignment="true"
subsegmentStartsWithSAP="1">
      <SupplementalProperty
schemeIdUri="urn:mpeg:dash:sai:spatial:2017" value="1"/>
      <SupplementalProperty schemeIdUri="urn:mpeg:dash:srd:simul:2017"
value="0,1,1,1,1,2,2"/>
      ...
    </AdaptationSet>
<!-- Tile 4 -->
    <AdaptationSet segmentAlignment="true" subsegmentAlignment="true"
subsegmentStartsWithSAP="1">
      <SupplementalProperty
schemeIdUri="urn:mpeg:dash:sai:spatial:2017" value="1"/>
      <SupplementalProperty schemeIdUri="urn:mpeg:dash:srd:simul:2017"
value="0,0,1,1,1,2,2"/>
      ...
    </AdaptationSet>
  </Period>
</MPD>
```

*Figure 17b*

INCREMENTAL QUALITY DELIVERY AND COMPOSITING PROCESSING

CROSS REFERENCE TO RELATED APPLICATIONS

The present application is a national stage filing under 35 U.S.C. 0 371 of International Patent Application Serial No. PCT/CN2017/100150, filed Sep. 1, 2017, that claims the priority benefit of U.S. Provisional Patent Application Nos. 62/382,807, 62/385,297, 62/436,010, 62/444,884 and 62/444,889, filed on 2 Sep. 2016, 9 Sep. 2016, 19 Dec. 2016, 11 Jan. 2017, and 11 Jan. 2017, respectively. Contents of above-listed provisional applications are herein incorporated by reference.

FIELD OF INVENTION

The present disclosure relates generally to delivery of media content. In particular, the present disclosure relates to methods of preparation, delivery, and composition of media content of scalable video and 360-degree virtual reality (360VR).

BACKGROUND OF THE INVENTION

Unless otherwise indicated herein, approaches described in this section are not prior art to the claims listed below and are not admitted as prior art by inclusion in this section.

Video coding is used in a wide range of applications ranging from multimedia messaging, video telephony and video conferencing over mobile TV, wireless and Internet video streaming, standard- and high-definition TV broadcasting, as well as virtual reality (VR). Furthermore, video content is delivered to a variety of decoding devices with heterogeneous display and computational capabilities.

Video bit-stream scalability facilitates graceful degradation of transmission of coded video. Video scalability schemes such as scalable video coding (SVC) allows the same coded video of one particular standard (e.g., H.264/AVC) to adapt to different requirements of bit rates, spatial formats, and/or power consumption when the same coded video is delivered to different decoding devices with heterogeneous display and computational capabilities. To facilitate video bit-stream scalability, the coded video is simultaneously transmitted or stored with a variety of spatial or temporal resolutions or qualities.

360-degree Virtual Reality (360VR) is an audiovisual simulation of an altered, augmented, or substituted environment. The visual reality video surrounds the user, allowing the user to look around in any direction or at any arbitrary view angle, just as he or she can in real life. 360VR videos produce exceptional high-quality and high-resolution panoramic videos for use in print and panoramic virtual tour production for a variety of applications, such as entertainment, pilot training, surgery, and exploration in space or deep water.

SUMMARY OF THE INVENTION

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the present disclosure provide an incremental quality delivery and compositing scheme, in which media content (e.g., video or images) is encoded into multiple different layers or spatial objects that can be composited into presentations with varying qualities. The spatial objects are independently encoded and can be independently decoded. The encoded media content is associated with metadata that includes parameter(s) for at least some of spatial objects as well as parameter(s) characterizing the relationships between the spatial objects.

In some embodiments, a media content delivery apparatus encodes media content into multiple spatial objects. The media content delivery apparatus encodes a first spatial object according to a first set of parameters. The media content delivery apparatus also encodes a second spatial object according to a second set of parameters. The first and second spatial objects are encoded independently. The media content delivery apparatus also generates a metadata based on the first set of parameters, the second set of parameters, and a relationship between the first and second spatial objects. The media content delivery apparatus then transmits or stores the encoded first spatial object, the encoded second spatial object, and the generated metadata.

In some embodiments, the first spatial object is encoded by a first video or image coding standard and the second spatial object is encoded by a second, different video coding standard. The second spatial object may be encoded by intra-coding without inter-prediction-coding. The first spatial object is a base quality layer object that is down-converted from an original image. The second spatial object is an incremental quality layer that is derived by (i) reconstructing the base quality layer object from an encoded base quality layer object, (ii) up-converting the reconstructed base quality layer object to a particular resolution, and (iii) computing a difference between the up-converted reconstructed base quality layer object and the original image at the particular resolution.

In some embodiments, the metadata may include a down-conversion ratio of the down-conversion of the base quality layer from the original image. The base quality layer may be in a first projection mode and the incremental quality layer in a second, different projection mode. The metadata may include a parameter identifying the first projection mode, the second projection mode, and a packing mode of base quality layer. The metadata may include a parameter for specifying objects in spatial domain as sub-assets of media content.

The metadata may include a parameter identifying the first projection mode and a packing mode of the base quality layer. The metadata may also include a down-conversion ratio of the down-conversion of the base quality layer from the original image. The metadata may include a parameter for specifying the second spatial object as a sub-asset of an asset. The metadata may include a parameter indicating that the first and the second spatial objects can be processed for simultaneous presentation. The metadata may also include a parameter specifying a mode for blending the first and second spatial image when compositing the decoded first spatial object with the decoded second spatial object.

In some embodiments, a media content compositing apparatus decodes multiple spatial objects and composites the decoded spatial objects into a composite presentation. The media content compositing apparatus receives an encoded first spatial object, an encoded second spatial object, and a metadata associated with the encoded first and second spatial objects. The media content compositing apparatus decodes the first spatial objects according to a first set of parameters derived from the metadata. The media content compositing apparatus also decodes the second spatial object according to a second set of parameters derived from the metadata. The first and second spatial objects are decoded independently. The media content compositing apparatus composites the decoded first spatial object with the decoded second spatial object into a composite presentation according to a relationship parameter between the first and second spatial objects derived from the metadata. In some embodiments, the second spatial object may be partially fetched and decoded according to a region of interest (ROI) selection. The composite presentation may be a virtual reality (VR) video based on omnidirectional images, and wherein the ROI selection is based on a viewport specified by a VR device.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIGS. 9a-b illustrates an example MPD that signals presence and the relationship of the base and incremental quality content.

FIG. 10 illustrates an example MPD in which the incremental quality content is encoded as a HEVC tile.

FIG. 11 is an example MPD in which the projection and packing format for VR projection are indicated.

FIG. 12 illustrates the syntax of a 2D Cartesian coordinate sample that carries blending information as parameters.

FIG. 13 illustrates an example MPD that uses 2D Cartesian coordinate sample that carries blending information as parameters.

FIG. 14 illustrates the syntax of a 2D Cartesian coordinate sample that is used to store blending information.

FIG. 15 illustrates an example MPD that uses blending information stored as 2D Cartesian coordinate samples.

FIG. 16 illustrates an example MPD with SRD scheme that enables simultaneous presentations.

FIGS. 17a-b illustrate an example MPD that uses sub-asset scheme to signal spatial objects or spatial parts of a composite presentation.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Compositing Independently Encoded Spatial Objects

Some embodiments of the present disclosure provide a scheme for delivering or transmitting media content that are to be composited into a composite presentation. The media content is independently encoded as spatial objects that can be independently decoded. The encoded media content is associated with metadata that includes parameters for at least some of spatial objects as well as parameters characterizing the relationships between the spatial objects.

Figure 1:
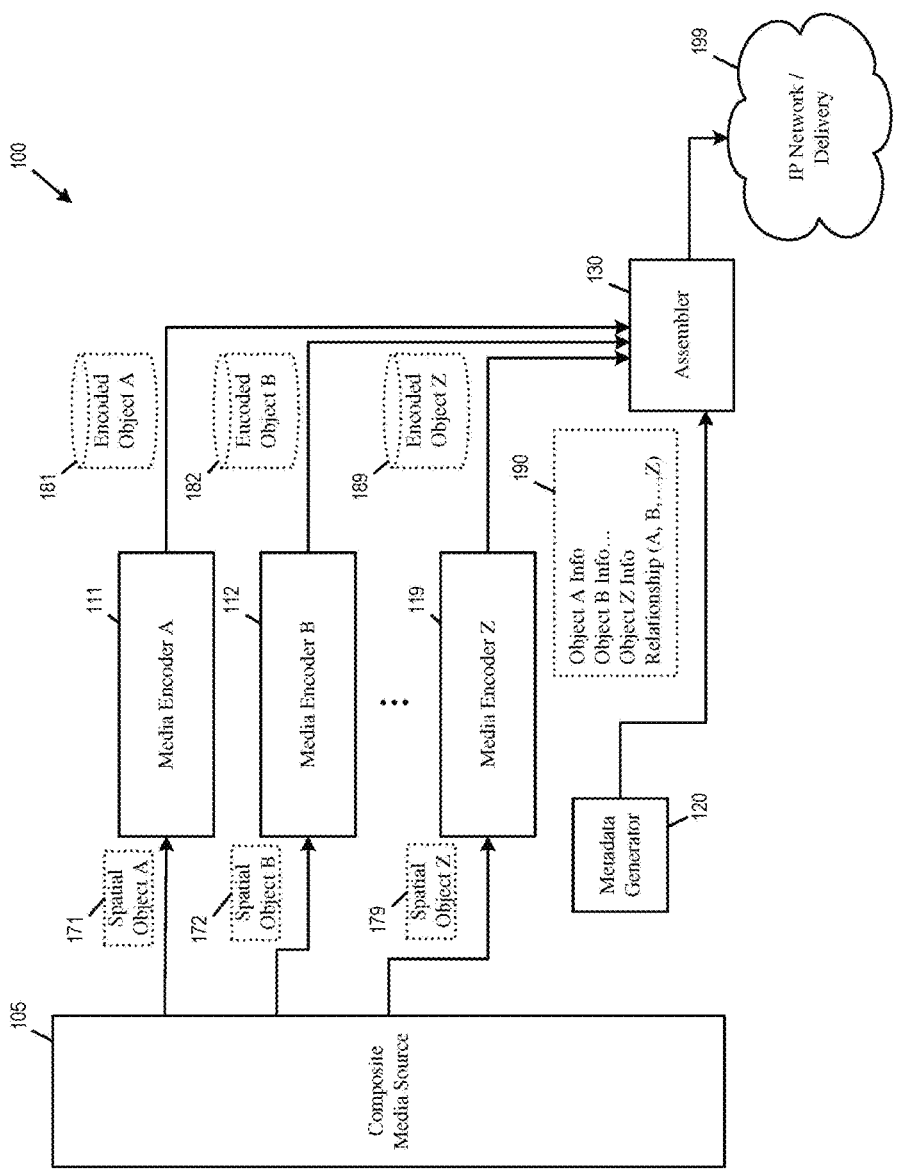
FIG. 1 illustrates a media content delivery apparatus.

FIG. 1 illustrates a media content delivery apparatus 100 that encodes media content for a composite presentation and generates metadata characterizing encoded spatial objects. The spatial objects are encoded independently. The metadata includes parameter(s) for at least some of the spatial objects as well as parameter(s) characterizing the relationships between the spatial objects.

As illustrated, the media content delivery apparatus 100 includes a composite media source 105, several media encoders 111-119, a metadata generator 120, and an assembler 130. In some embodiments, the modules 105-130 are modules of software instructions being executed by one or more processing units (e.g., a processor) of a computing device or electronic apparatus. In some embodiments, the modules 105-130 are modules of hardware circuits implemented by one or more integrated circuits (ICs) of an electronic apparatus. Though the modules 105-120 are illustrated as being separate modules, some of the modules can be combined into a single module.

The composite media source 105 provides various media content as spatial objects 171-179 to the media encoders 111-119. Each of the media encoders 111-119 encodes their respective received spatial objects 171-179 into corresponding encoded objects 181-0189 respectively. The metadata generator 120 generates metadata 190 that includes information regarding the spatial objects 181-0189 as well as the relationships among the spatial objects. The assembler 130 assembles the encoded spatial objects 181-189 with the metadata 190 as a data stream or data file for transmission through an IP Network 199 (e.g., the Internet) or for storage.

The composite media source 105 can include one or multiple media sources that provide video (sequence or sequences of images), still images, and/or other types of media. The spatial objects provided by the composite media source can include different types of overlay objects. In some embodiments, the composite media source 105 decomposes an original video source into component layers of a scalable video, each component layer corresponding to a spatial object. Such a spatial object may correspond to a base quality layer or an incremental quality layer of the scalable video. Section II below describes a composite media delivery scheme in which spatial objects correspond to base quality layers and incremental quality layers of a scalable video are delivered and composited.

The media encoders 111-119 perform encoding of their respective spatial objects independently of any other media encoders (or independently of encoding operations of other spatial objects). In some embodiments, the media encoders 111-119 include video encoders that perform spatial and/or temporal compression. Such video encoders compress their spatial objects without referring to any other spatial objects. For example, the media encoder 111 may encode a pixel block of the spatial object 171 by inter-prediction or intra-prediction within the spatial object 171, but such prediction coding would never refer to any of the spatial objects 172-179.

Furthermore, the media encoders 111-119 may encode their respective spatial objects by using different media coding standards. This allows flexible codec selection (e.g., HEVC, AVC, or JPEG) that provides SVC performance without SVC codec. For example, the media encoder 111 may encode the spatial object 171 according to H.265/HEVC, the media encoder 112 may encode the spatial object 172 according to H.264/AVC, another media encoder may encode a spatial object according to VP9, and the media encoder 119 may encode the spatial object 179 as still images according to JPEG, etc. An example media encoder that performs video encoding according to H.265/HEVC will be described by reference to FIG. 18 below.

It is worth noting that, though the different spatial objects may be derivatives of a same original video and hence not independent of each other (e.g., the different spatial objects may correspond to different base quality layers and/or incremental quality layers of a same scalable video), the encoding operations of the different spatial objects are nevertheless independent of each other.

The metadata generator 120 produces the metadata 190, which signals information on the spatial objects 171-179. Such information may include encoding parameters used by the media encoders 111-119 to produce the encoded objects 181-189. Such information may also include resolution of each spatial object, size of each spatial object, the coding standard used to encode each spatial object, information for virtual reality presentation, and/or other types of information. The metadata 190 may also include information that characterizes the relationships between the different spatial objects 171-179, information such as the relative positions between the spatial objects, relative transparency or opaqueness between the spatial objects, down-conversion and/or up-conversion relationships between the spatial objects (e.g., factors for temporal or spatial up/down sampling), time delay between the appearance of spatial objects, and/or or other types of spatial or temporal relationships.

In some embodiments, the metadata 190 and the encoded objects 181-189 are transmitted as a data stream. The signaling of metadata for composite processing of spatial objects will be described in Section IV below.

Figure 2:
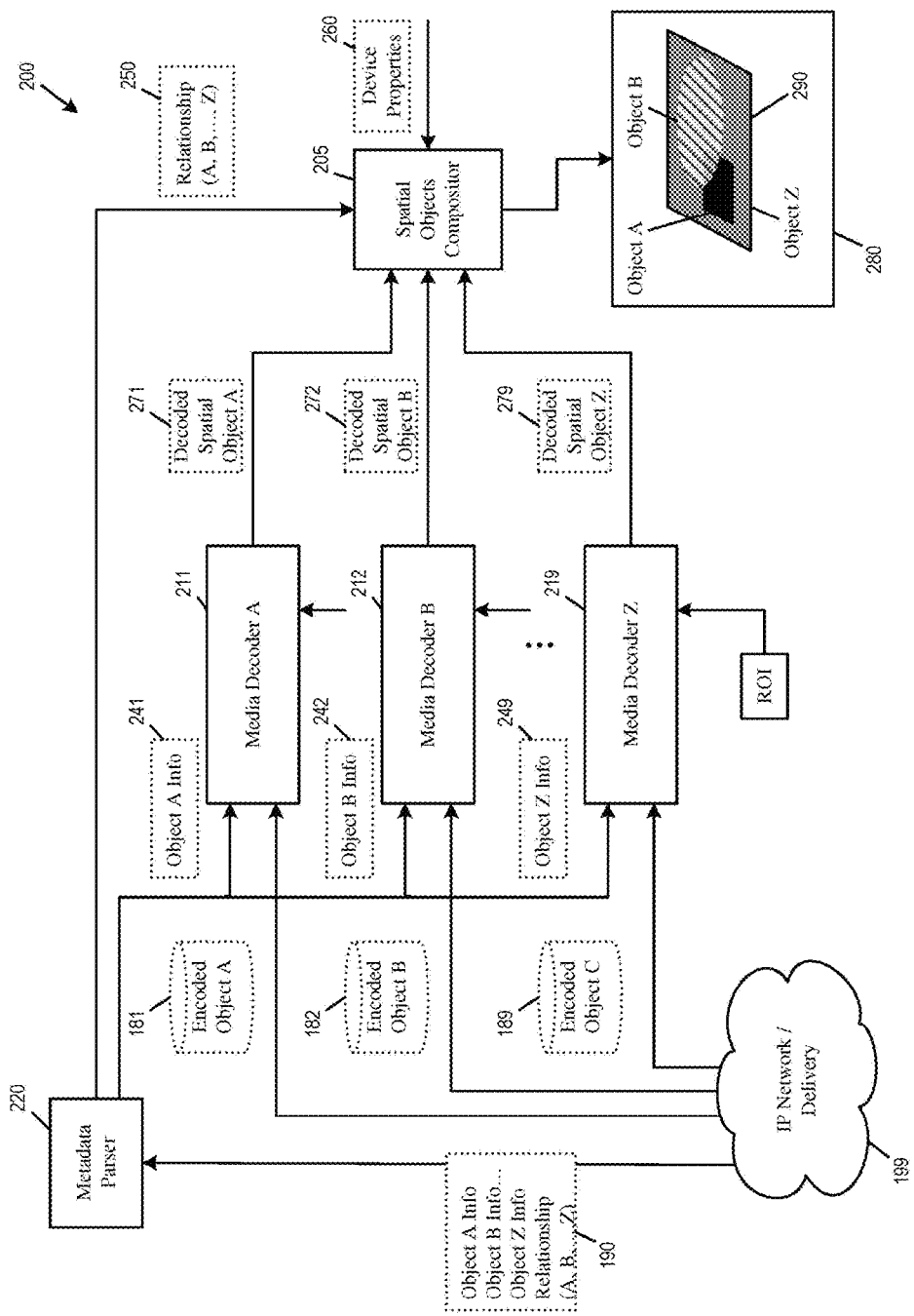
FIG. 2 illustrates a media content compositing apparatus.

FIG. 2 illustrates a media content compositing apparatus 200 that decodes spatial objects independently and composites the spatial objects into a composite presentation according to an associated metadata. Specifically, the media content compositing apparatus 200 receives the encoded objects 181-189 and the metadata 190, then decodes and composites the received spatial objects into a presentation based on the content of the metadata 190.

As illustrated, the media content compositing apparatus 200 includes a metadata parser 220, media decoders 211-219, as well as a spatial object compositor 205. In some embodiments, the modules 205-220 are modules of software instructions being executed by one or more processing units (e.g., a processor) of a computing device or electronic apparatus. In some embodiments, the modules 205-220 are modules of hardware circuits implemented by one or more integrated circuits (ICs) of an electronic apparatus. Though the modules 205-220 are illustrated as being separate modules, some of the modules can be combined into a single module.

The media content compositing apparatus 200 receives the encoded objects 181-189 and the metadata 190 generated by the media content delivery apparatus 100. The media decoders 211-219 respectively decode the encoded objects 181-189 to produce decoded spatial objects 271-279 (which are decoded versions of the spatial objects 171-179). The spatial object compositor 205 in turn composites the decoded spatial objects 271-279 into a composite presentation 290 (or multiple composite presentations) for display at a display device 280.

The metadata parser 220 parses the metadata 190 to extract spatial object information 241-249, which are used by the media decoders 211-219 respectively to decode the encoded objects 181-189. The spatial object information 241-249 are derived from information such as resolution of each spatial object, size of each spatial object, the coding standard used to encode each spatial object, information for virtual reality presentation, and/or other types of information that were used to encode each spatial object.

The metadata parser also parses the metadata 190 to extract relationship information 250, which is used by the spatial objects compositor 205 to determine how to composite the various decoded spatial objects 271-279 into the presentation 290. The relationship information 250 includes information that characterizes the relationships between the different spatial objects 171-179, information such as the relative positions between the spatial objects, relative transparency or opaqueness between the spatial objects, down-conversion and/or up-conversion relationships between the spatial objects (e.g., factors for temporal or spatial up/down sampling), time delay between the appearance of spatial objects, and/or or other types of spatial or temporal relationships.

The media decoders 211-219 perform decoding of their respective spatial objects independently of any other media decoders (or independently of decoding operations of other spatial objects). In some embodiments, the media decoders include video decoders that perform spatial and/or temporal decompression and that each media decoder decompresses its spatial object without referring to any other spatial objects. For example, the media decoder 211 may decode a pixel block of the spatial object 271 (decoded from encoded spatial object 181) by inter-prediction or intra-prediction within the spatial object 271, but such prediction coding would never refer to any of the decoded spatial objects 272-279 (decoded from encoded spatial object 182-189).

In addition to the extracted spatial object information 241-249, at least some of the decoders 211-219 perform their decoding operations based on a region of interest (ROI) selection input. In these instances, some of the decoded spatial objects 271-279 generated by the media decoders 211-219 may be partially decoded versions of the spatial objects 171-179 sufficient to cover the selected ROI. Specifically, some of the media decoders 211-219 request/fetch and decode only the relevant or necessary portions of their respective spatial objects from the source (e.g., media content delivery apparatus 100) according to the ROI selection, while portions not needed for the ROI are not requested/fetched or decoded.

Section III below provides an example in which the composite presentation is a 360-degree VR (360VR) video based on omnidirectional images, and the ROI selection indicates to the media decoders which part of the omnidirectional image is the region of interest (e.g., a viewport specified by a VR device based on current user interaction).

In addition, each decoder is also configured to decode its assigned spatial object according to coding standard, resolution, and/or size specified by its corresponding spatial object information provided by the metadata 190 (e.g., the media decoder 211 decodes the encoded object 181 according to parameters specified by the spatial object information 241). An example media decoder that performs video decoding according to H.265/HEVC will be described by reference to FIG. 19 below.

The spatial object compositor 205 composites the decoded spatial objects 271-279 into a composite presentation 290 for display or storage. The composite operation is performed according to the relationship information 250 extracted from the metadata 190. The composite operation is also based on a set of device properties 260, which may include size, dimension, and/or resolution of the target display device. The spatial object compositor 205 may perform up-conversion and/or down-conversion on the received spatial objects or the resulting composite presentation 290 based on the parameters specified by the device properties 260.

Figure 3:
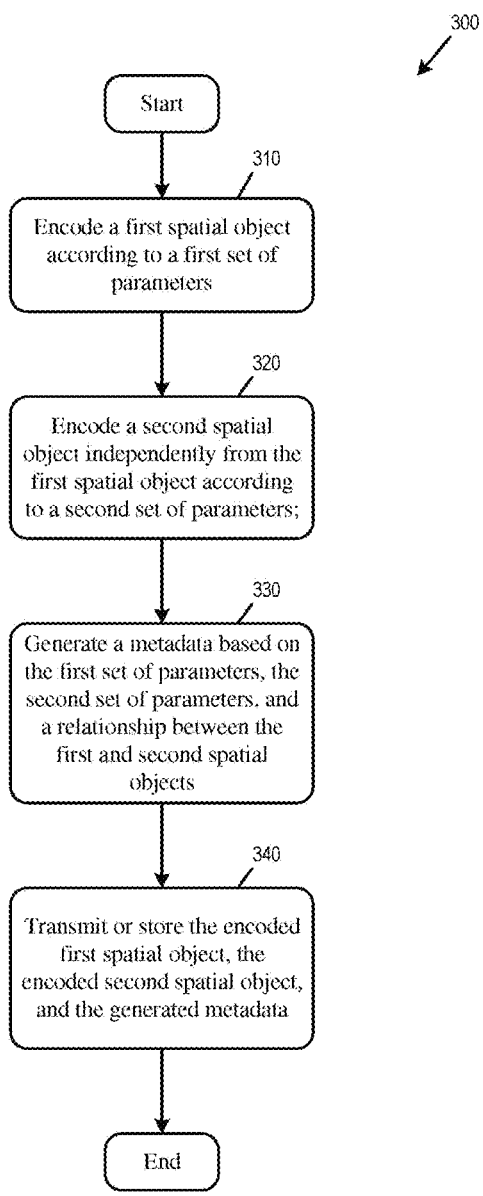
FIG. 3 conceptually illustrates a process for encoding spatial objects of a composite presentation.

FIG. 3 conceptually illustrates a process 300 for encoding spatial objects of a composite presentation. In some embodiments, the media content delivery apparatus 100 performs the process 300 when it encodes the spatial objects independently and generates a metadata characterizing the encoded spatial objects. In some embodiments, one or more processing units (e.g., a processor) of a computing device implementing the media content delivery apparatus 100 performs the process 300 by executing instructions stored in computer readable medium.

The process 300 starts when the media content delivery apparatus 100 receives spatial objects from a composite media source. The spatial objects can include video, still images, and/or other types of media objects. A spatial object may correspond to a base quality layer or an incremental quality layer of a scalable video. Section II below describes a composite media scheme in which spatial objects corresponds to base quality layers and incremental quality layers of a scalable video.

The media content delivery apparatus encodes (at step 310) a first spatial object according to a first set of parameters. The media content delivery apparatus also encodes (at step 320) a second spatial object according to a second set of parameters. The first and second spatial objects are encoded independently. In some embodiments, the first spatial object is encoded by a first video/image coding standard and the second spatial object is encoded by a second, different video/image coding standard. In some embodiments, the first spatial object is encoded by prediction without referring to the second spatial object and the second spatial object is encoded by prediction without referring the first spatial object. In some embodiments, the second spatial object is encoded by intra-coding only without inter-prediction.

The media content delivery apparatus also generates (at step 330) a metadata based on the first set of parameters (of the first spatial object), the second set of parameters (of the second spatial object), and a relationship between the first and second spatial objects. The information based on the first and/or second sets of parameters may include resolution of each spatial object, size of each spatial object, the coding standard used to encode each spatial object, and/or information for virtual reality presentation. The relationship information between the spatial objects may include the relative positions between the spatial objects, relative transparency or opaqueness between the spatial objects, down-conversion and/or up-conversion relationships between the spatial objects (e.g., factors for temporal or spatial up/down sampling), time delay between the appearance of spatial objects, and/or or other types of spatial or temporal relationships.

The media content delivery apparatus then transmits (at 340) or stores the encoded first spatial object, the encoded second spatial object, and the generated metadata. The process 300 then ends. In some embodiments, the encoded first and second spatial object are assembled into a data stream along with the generated metadata for transmission or storage. The signaling of metadata for composite processing of spatial objects will be described in Section IV below.

Figure 4:
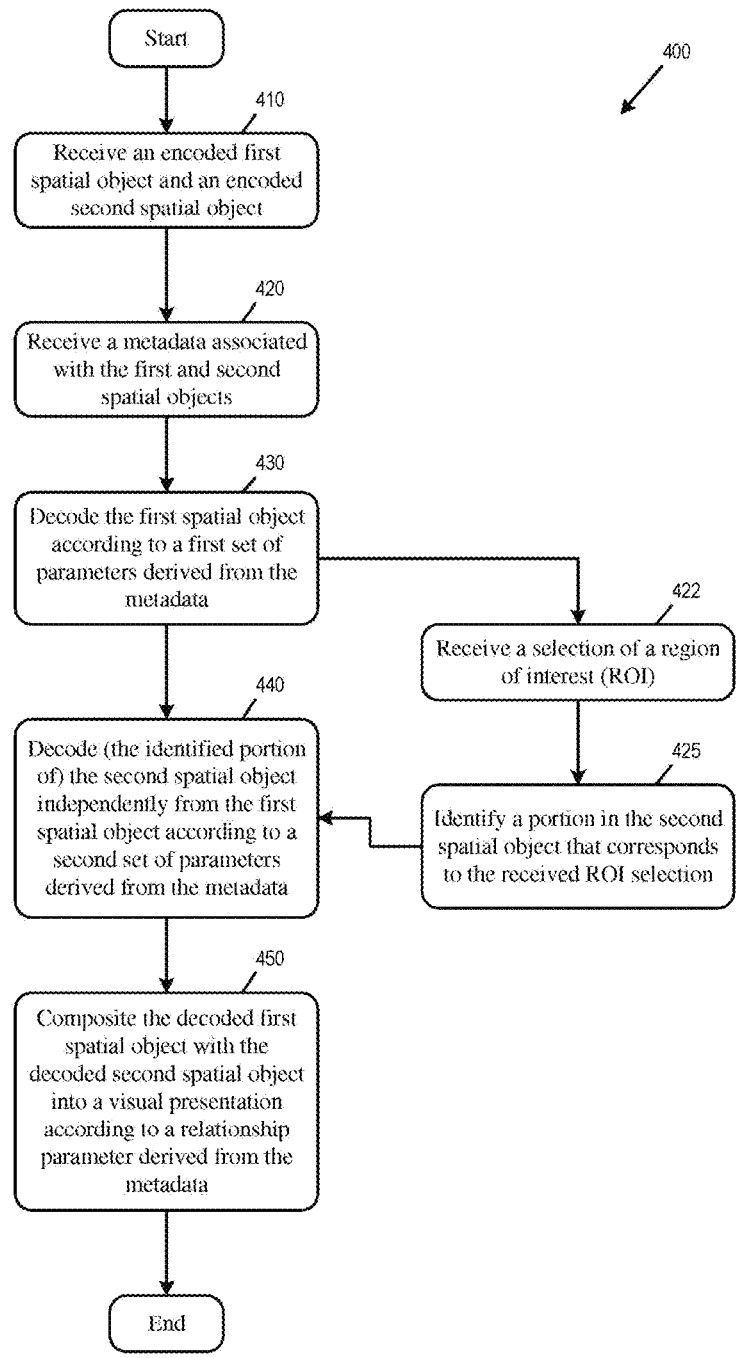
FIG. 4 conceptually illustrates a process for decoding spatial objects of a composite presentation.

FIG. 4 conceptually illustrates a process 400 for decoding spatial objects of a composite presentation. In some embodiments, the media content compositing apparatus 200 performs the process 400 when it decodes spatial objects independently and composites the decoded spatial objects into a composite presentation according to an associated metadata, which includes parameter(s) for at least some of spatial objects as well as parameter(s) characterizing the relationships between the spatial objects. In some embodiments, one or more processing units (e.g., a processor) of a computing device implementing the media content compositing apparatus 200 performs the process 400 by executing instructions stored in computer readable medium.

The process 400 starts when the media content compositing apparatus 200 receives (at step 410) an encoded first spatial object and an encoded second spatial object. The media content compositing apparatus 200 also receives (at step 420) a metadata associated with the first and second spatial objects. The first and/or second sets of parameters may include resolution of each spatial object, size of each spatial object, the coding standard used to encode each spatial object, and information for virtual reality presentation. The relationship information between the spatial objects may include the relative positions between the spatial objects, relative transparency or opaqueness between the spatial objects, down-conversion and/or up-conversion relationships between the spatial objects (e.g., factors for temporal or spatial up/down sampling), time delay between the appearance of spatial objects, and/or or other types of spatial or temporal relationships. The signaling of metadata for composite processing of spatial objects will be described in Section IV below.

The media content compositing apparatus decodes (at step 430) the first spatial objects according to a first set of parameters derived from the metadata. The media content compositing apparatus also decodes (at step 440) the second spatial object according to a second set of parameters derived from the metadata. The first and second spatial objects are decoded independently.

In some embodiments, the media content compositing apparatus also receives (at step 422) a selection of a region of interest (ROI) and identifies (at step 425) a portion in the second spatial object that corresponds to the received ROI selection. In these instances, the media content compositing apparatus decodes the identified portion of the second spatial object relevant to the ROI rather than the entire second spatial object. Section III below provides an example in which the composite presentation 290 is a 360-degree VR (360VR) video based on omnidirectional images, and the ROI selection corresponds to a viewport specified by a VR device. The identified portion of ROI corresponds to a portion of the second spatial object that is necessary for decoding a region including the specified ROI. In some embodiments, the second spatial object is intra-coded without inter-prediction so it can be randomly addressed and decoded for the selected ROI in an efficient manner.

The media content compositing apparatus composites (at step 450) the decoded first spatial object with the decoded second spatial object into a composite presentation according to a relationship parameter between the first and second spatial objects derived from the metadata. The process 400 then ends.

II. Incremental Quality Delivery

In some embodiments, the encoded spatial objects are different layers of a scalable video that can be composited into presentations with varying qualities. Specifically, the encoded spatial object can include at least one base quality layer spatial object and at least one incremental quality layer spatial object. A base quality layer spatial object may include a video (e.g., a sequence of images) object or an image object that is temporally and/or spatially down-converted from an original video (or image). An incremental quality layer spatial object may include the difference between an up-converted version of the base quality layer object and the original video.

Figure 5:
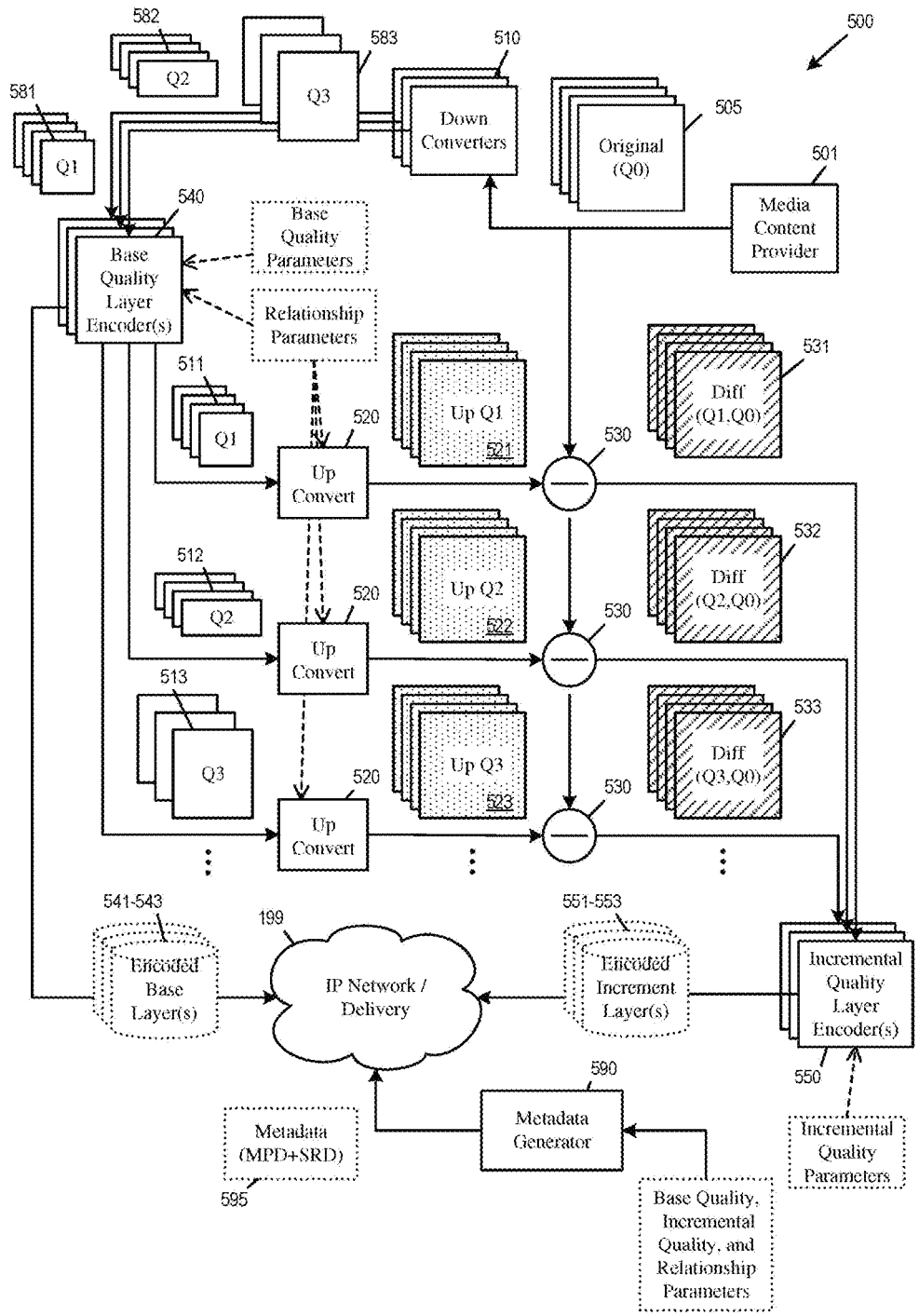
FIG. 5 illustrates a scalable video encoder that encodes base quality layers and incremental quality layers to be composited.

FIG. 5 illustrates a scalable video encoder 500 that encodes base quality layers and incremental quality layers to be composited. The scalable video encoder generates a variety of different base quality layers and incremental quality layers. The scalable video encoder 500 generates the various base quality layers by down-converting (e.g., down-sampling) an original video or image, each generated base quality layer having a reduced spatial resolution (or dimension) and/or reduced frame rate. Each incremental quality layer includes the information necessary to reconstruct the original video or image at a particular resolution from a corresponding base quality layer by compositing the corresponding base quality layer with the incremental quality layer. These various layers can be selectively delivered to target decoding/display devices based on the capacity of the transmission medium and the quality requirement of the target devices.

As illustrated, the scalable video encoder 500 includes down-converters 510, up-converters 520, comparators 530, base quality layer encoders 540, incremental quality layer encoders 550, and a metadata generator 590. In some embodiments, the modules 510, 520, 530, 540, 550, and 590 are modules of software instructions being executed by one or more processing units (e.g., a processor) of a computing device or electronic apparatus. In some embodiments, the modules 510, 520, 530, 540, 550, and 590 are modules of hardware circuits implemented by one or more integrated circuits (ICs) of an electronic apparatus. Though the modules 510, 520, 530, 540, 550, and 590 are illustrated as being separate modules, some of the modules can be combined into a single module.

The scalable video encoder 500 receives original media content 505 from a media content provider 501 (the original media content 505 is illustrated as a video having a sequence of images). The original media content 505 is down-converted spatially and/or temporally by the down-converters 510 into down-converted objects 581-583 of various spatial and/or temporal resolutions. The down-converted objects 581-583 are illustrated as videos having images with less spatial resolution than the original media content 505. The down-converted object 583 in particular is illustrated as a video having lower frame rate/temporal resolution than the original media content 505.

The base quality layer encoder 540 encodes the down-converted objects 581-583 into encoded base layer objects 541-543, respectively. The base quality layer encoder 540 also reconstructs the down-converted objects as base layer objects 511-513. The base quality layer objects 511-513 are up-converted spatially and/or temporally by the up-converters 520 into up-converted base quality layer objects 521-523 to match the resolution of the original content 505. The comparators 530 compare the up-converted base quality layer objects 521-523 with the original media content 505 to produce differential objects 531-533 as incremental quality layer objects. The incremental quality layer encoders 550 encodes the incremental quality layer (or differential) objects 531-533 into encoded incremental quality layer objects 551-553.

Each base quality layer encoder 540 and each incremental quality layer encoder 550 operate independently of any other base quality layer encoders and incremental quality layer encoders. In some embodiments, each base quality layer encoder 540 performs its own intra- and/or inter-prediction operations when encoding its base quality object without referring to any other base quality layer or incremental quality layer objects. (Likewise, each incremental quality layer encoder 550 performs its own intra- and/or inter-prediction operations when encoding its incremental quality object without referring to any other base quality layer or incremental quality layer objects.) In some embodiments, different base quality layer encoders and incremental quality layer encoders may employ different video/image coding standards.

In some embodiments, the scalable video encoder 500 is a species of the media content delivery apparatus 100, in which the base quality layers and the incremental quality layers are encoded as spatial objects and delivered for subsequent compositing processing. In other words, the down-converters 510, the up-converters 520, and the comparators 530 are components of the composite media source 105. The base quality layer objects 511-513 and the incremental quality layer (or differential) objects 531-533 are spatial objects being independently encoded by media encoders 111-119 (which correspond to the base quality layer encoders 540 and the incremental quality layer encoders 550).

Though not illustrated, the scalable video encoder 500 not only generates incremental quality layer objects that are each based on differences between a base quality layer and the original image, but also incremental quality layer objects that are based on differences among the various base quality layers. Such incremental quality layers allow the reconstruction of one base quality layer at a first resolution by compositing another base quality layer at second, lower resolution with a corresponding incremental quality layer.

The scalable video encoder 500 also generates metadata 595 (by the metadata generator 590) that characterizes each base quality layer object and each incremental quality layer object. For each base quality layer or incremental quality layer object, the metadata may include spatial and/or temporal resolution, coding standard, virtual reality presentation information, and/or other types of information according to which the base quality layer encoders 540 generate the encoded base quality layer objects 541-543 and the incremental quality layer encoders 550 generate the encoded incremental quality layer objects 551-553. The metadata 590 may also include information that characterizes the relationships between base quality layer objects and incremental quality layer objects, information such the conversion ratios (e.g., the factor used by the up-converters 520 to up-convert the base quality layer objects 511-513 into up-converted base quality layer objects 521-523) for matching the resolution of each base quality layer with its corresponding incremental quality layer.

The metadata 595, the encoded base quality layer objects 541-543, and the encoded incremental quality layer objects 551-553 are provided to the IP network for delivery to target devices. A scalable video decoder as a target device receives and decodes some of the base quality layer objects and incremental quality layer objects based on its bit rate and quality requirement. The scalable video decoder composites the decoded base quality layer object and a decoded incremental quality layer object into a composite presentation at a desired quality.

Figure 6:
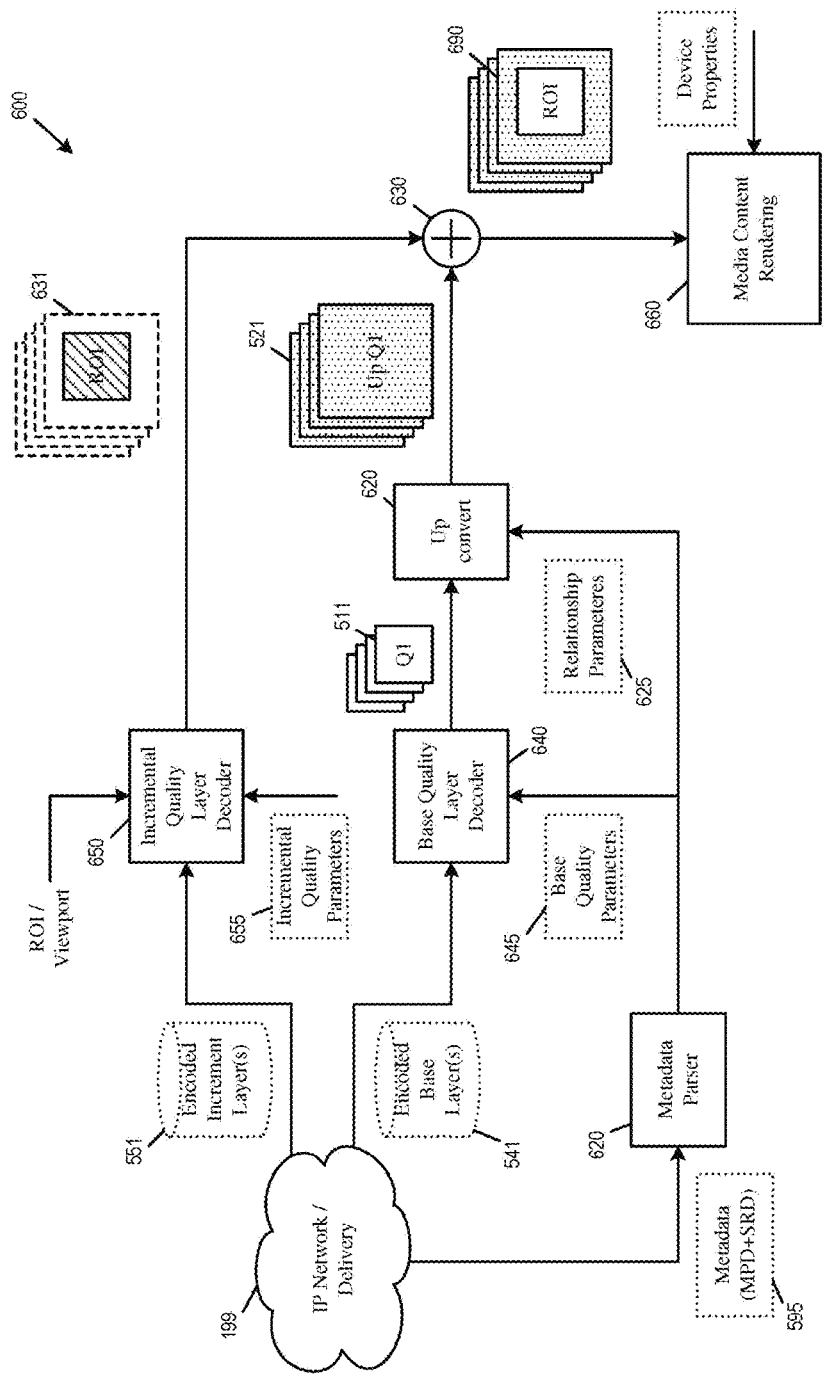
FIG. 6 illustrates a scalable video decoder that receives, decodes, and composites base quality layer objects and incremental quality layer objects for a scalable video presentation.

FIG. 6 illustrates a scalable video decoder 600 that receives, decodes, and composites base quality layer objects and incremental quality layer objects for a scalable video presentation. In the illustrated example, the scalable video decoder 600 receives the encoded base quality layer object 541, the encoded incremental quality layer object 551, and the metadata 595. The scalable video decoder 600 decodes the received objects based on content of the metadata 595 and composites the decoded objects into a composite presentation 690 at a desired level of quality based on properties of the device.

The scalable video decoder 600 includes a base quality layer decoder 640, an incremental quality layer decoder 650, an up-converter 620, a compositor (adder) 630, and a media content renderer 660. In some embodiments, the modules 620, 630, 640, 650, and 660 are modules of software instructions being executed by one or more processing units (e.g., a processor) of a computing device or electronic apparatus. In some embodiments, the modules 620, 630, 640, 650, and 660 are modules of hardware circuits implemented by one or more integrated circuits (ICs) of an electronic apparatus. Though the modules 620, 630, 640, 650, and 660 are illustrated as being separate modules, some of the modules can be combined into a single module.

As illustrated, the scalable video decoder 600 receives the encoded base quality layer object 541 and the encoded incremental quality layer object 551 from the IP network 199. The base quality layer decoder 640 decodes the base quality layer object 541 to recreate the base quality layer object 511 and the incremental quality layer decoder 650 decodes the incremental quality layer object 551 to recreate a decoded differential object 631. The up-converter 620 up-converts the decoded base quality layer object 511 into up-converted base quality layer object 521. The compositor (or adder) 630 then composites the base quality layer object 521 and the decoded differential object 631 to create the composite presentation 690. The media content renderer 660 renders the composite presentation 690 for display by the target device based on device properties of the target device.

In some embodiments, the scalable video decoder 600 is a species of the media content compositing apparatus 200, in which the base quality layers and the incremental quality layers are encoded as spatial objects and composited into a composite presentation. In other words, the up-converters 620, and the compositor 630 are components of the spatial object compositor 205. The base quality layer objects 511 and the incremental quality layer objects 531 are spatial objects being independently decoded by media decoders 211-219, which correspond to the base quality layer decoders 640 and the incremental quality layer decoders 650.

The decoding operations performed by the base quality layer decoder 640 and decoding operations performed by the incremental quality layer decoder 650 are independent of each other. In other words, the base quality layer object 541 and the incremental quality layer object 551 are decoded independently. The base quality layer decoder 640 may perform its own inter- and intra-prediction operations without referring to the incremental quality layer object and the incremental quality layer decoder 650 may perform own inter- and intra-prediction operations without referring to the base quality layer object.

The metadata parser 620 parses the metadata 590 to extract base quality layer parameters 645 and incremental quality layer parameters 655. The base quality layer decoder 640 uses the information to determine how to decode the base quality layer object 541 and the incremental quality layer decoder 650 uses the information to determine how to decode the incremental quality layer object 551. The base quality layer parameters 645 may include information such as the resolution and size of the base quality layer object 541, the VR presentation information of the base quality layer object, etc. The incremental quality layer parameters 655 may include information such as the resolution and size of the incremental quality layer object 551, the VR presentation information of the incremental quality layer object, etc. The metadata parser 620 also parses the metadata 595 to extract relationship parameters 625, which characterizes the relationships between base quality layer object 541 and incremental quality layer object 551, information such the up-conversion ratios for matching the resolution of the base quality layer with the incremental quality layer.

In some embodiments, the decoding operation of the incremental quality layer object 551 is based on a region of interest (ROI) selection input. The incremental quality layer decoder 650 correspondingly decodes only the relevant or necessary portions of the incremental quality layer object based on the ROI selection. Hence, the decoded differential object 631 may be a partially decoded version of the differential object 531. This partially decoded differential object 631 is illustrated as a smaller rectangle within the bigger rectangle that represents a full-sized differential object. Since the differential object 631 has differential data for only the portion of presentation that corresponds to the ROI, the resulting composite presentation 690 has full resolution for only the ROI while the image content outside of the ROI remain at the base quality. In some embodiments, the incremental quality layer object is intra-coded without inter-prediction so it can be randomly addressed and decoded for the selected ROI in an efficient manner.

III. Virtual Reality

Figure 7:
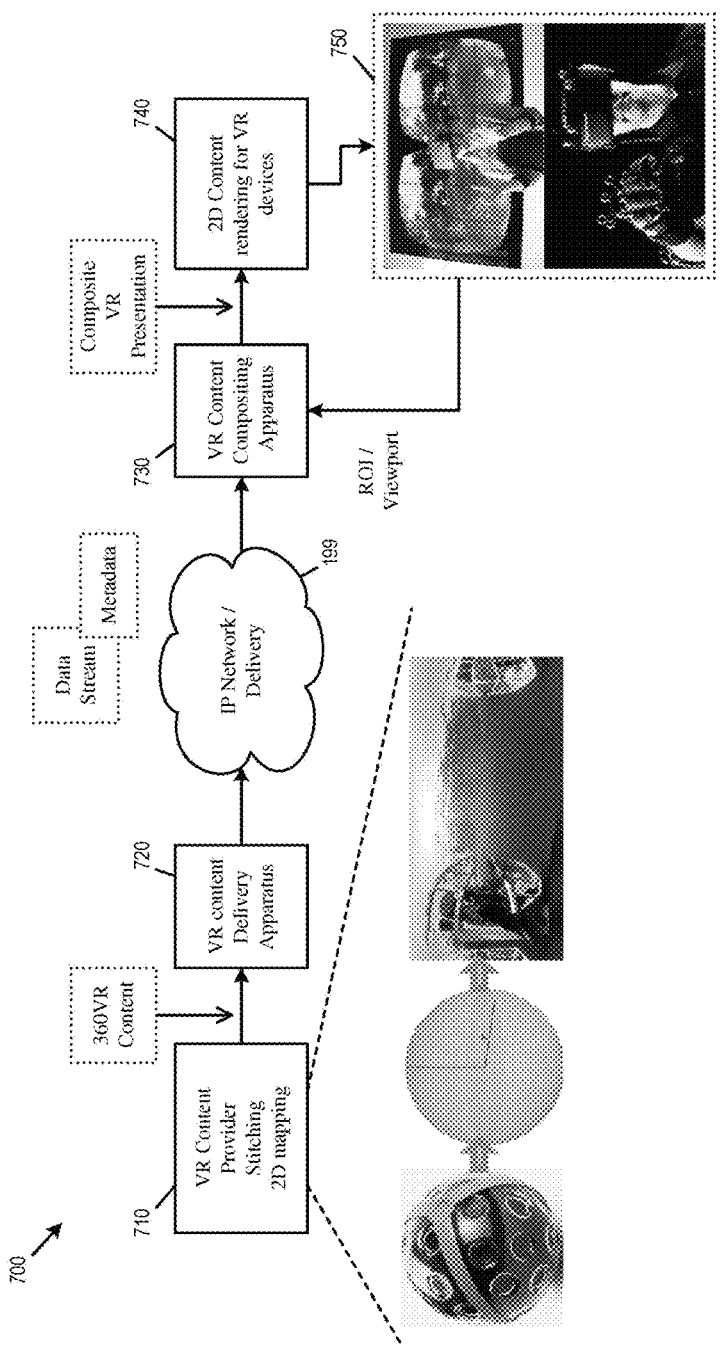
FIG. 7 illustrates a VR content delivery system, consistent with an exemplary embodiment.

In some embodiments, the scalable video encoder 500 and the scalable video decoder 600 are used to deliver 360-degree virtual reality (360VR) media content based on omnidirectional images. FIG. 7 illustrates a VR content delivery system 700, consistent with an exemplary embodiment.

As illustrated, the VR content delivery system 700 includes a 360VR content provider 710. The provided 360VR can be raw content provided by a camera, or a processed (e.g., projection mapped and/or stitched) version of the raw content in any 3D to 2D projection format, such as equirectangular projection (ERP), cube map projection (CMP), equal area projection (EAP), octahedron projection (OHP), etc.

A VR content delivery apparatus 720 deploys compression and streaming tools to compress the 360VR content into a single data stream with metadata and delivered across the IP network 199. The signaling of metadata for composite processing of spatial objects will be described in Section IV below.

A VR content compositing apparatus 730 receives the stream of 360VR content and the metadata and generates a composite VR presentation of the 360VR content. A content rendering engine 740 renders the composite VR presentation to a spherical environment for VR devices for client-side VR experiences. A VR device 750 specifies a sub-region in the 360VR content as a viewport, and the viewport specification is provided to the VR compositing apparatus 730 as a ROI selection. Such a VR device can be a VR goggle or a computing device capable of presenting 360VR media content to a user. In some embodiments, the VR content compositing apparatus 730 and the content rendering engine 740 are hardware or software components of the VR device 750.

In some embodiments, the scalable video encoder 500 implements the VR content delivery apparatus 720 and the scalable video decoder 600 implements the VR content compositing apparatus 730. In these instances, the VR content presented at the VR device is a composite VR presentation of a base quality layer object and an incremental quality layer object that are independently encoded and decoded according to parameters specified in the metadata.

The ROI selection/viewport specification from the VR device 750 allows the incremental quality layer decoder 650 to decode only a portion of the incremental quality layer object 551 necessary to cover the viewport, while portions of the incremental quality layer object 551 not necessary for showing the viewport are not decoded (and not requested/fetched from the VR content delivery apparatus 720). The incremental quality layer decoder may decode only a specific set of data units that includes the viewport, (e.g., a specific set of tiles, a specific set of views of a multi-view video, a specific face in a platonic solid projection, a specific set of slices, etc.), while data units not belonging to the specific set of data units are not fetched or decoded. The resulting composite VR presentation would have its viewport region at full resolution quality from the compositing of the base quality layer and the incremental quality layer, while the regions of the composite VR presentation outside of the viewport would only have base quality layer information.

For some embodiments, the base quality layer provided by the VR content delivery apparatus 720 may include an area larger than client viewport (or the entire projected omnidirectional area) in order to respond timely and cover the client's fast viewpoint change. On the other hand, the incremental quality layer provided by the VR content delivery apparatus 720 may cover only the client's viewport area and/or the surrounding areas for a better and incremental picture quality toward a good VR experience. For some embodiments, the base quality layer may cover most or all the viewport changes and the incremental quality layer may be generated with a low-delay and random-access friendly encoding techniques, e.g. the incremental quality layer encoder 550 performing only Intra-codingwithoutinter-prediction coding that may refer to pixels outside of the ROI/Viewport. As such, low-latency and random-access can be achieved for streaming of VR content.

For some embodiments, a VR content delivery system based on scalable video encoder 500 can be considered a closed-loop system, because the reconstructed, up-converted base quality layer content 511 is used to generate the incremental quality layer content 551-553 at the scalable video encoder 500 and to generate the final composite presentation 690 at the scalable video decoder 600 without introducing any error. Furthermore, the base quality layer content and the incremental quality layer content are necessarily in a same 3D to 2D projection format and/or packing format.

Some embodiments of the disclosure provide an implementation of the VR content delivery system that can be considered an open-loop system. In such an implementation, the generation of the incremental quality layer content is not based on the reconstruction of the encoded base quality layer content, and the incremental quality layer content may be generated from an omnidirectional image that is in a different projection format and/or different packing format than the base quality layer content. This allows the incremental quality layer content to be generated and encoded with very little latency. This also allows the base quality layer content to be in a most compact projection and/or packing format while the incremental quality layer content to be in a low-latency, random-access friendly format.

Specifically, the transmitting/delivery end of the VR content delivery system receives the original VR content in a first projection mode. It is down-converted and packaged as the base quality layer object without further projection mapping. The original VR content is projection mapped to a second projection mode in order create the incremental quality layer object. This allows the encoded base quality layer object and the encoded incremental quality layer object being delivered to be in different VR projection format. At the receiving/compositing end of the VR content delivery system, the base quality layer is unpacked and projection mapped to the second projection mode before compositing with the incremental quality layer to produce the composite VR presentation.

Figure 8A:
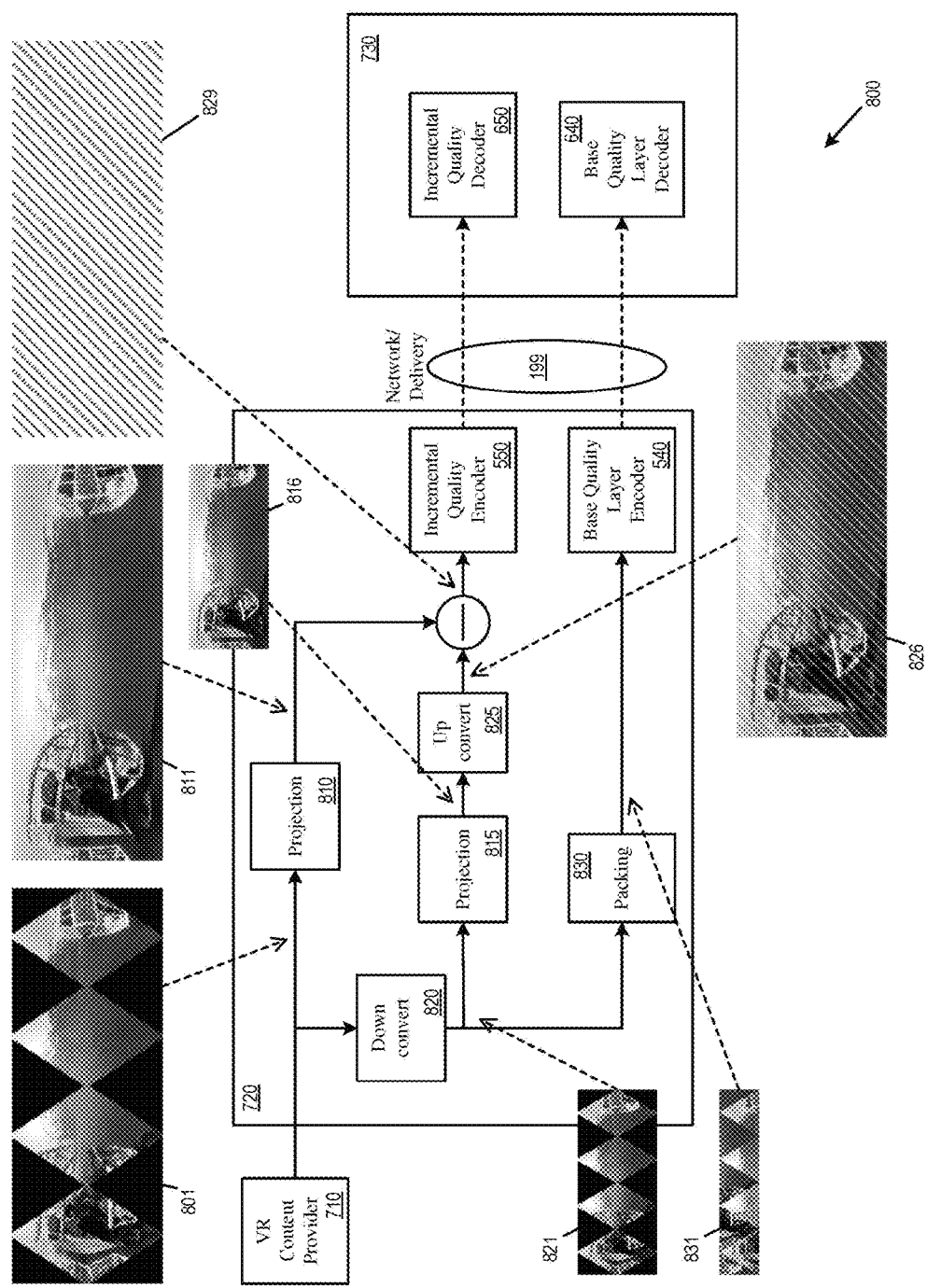
FIGS. 8a-b illustrate an implementation of the VR content delivery system.
Figure 8B:
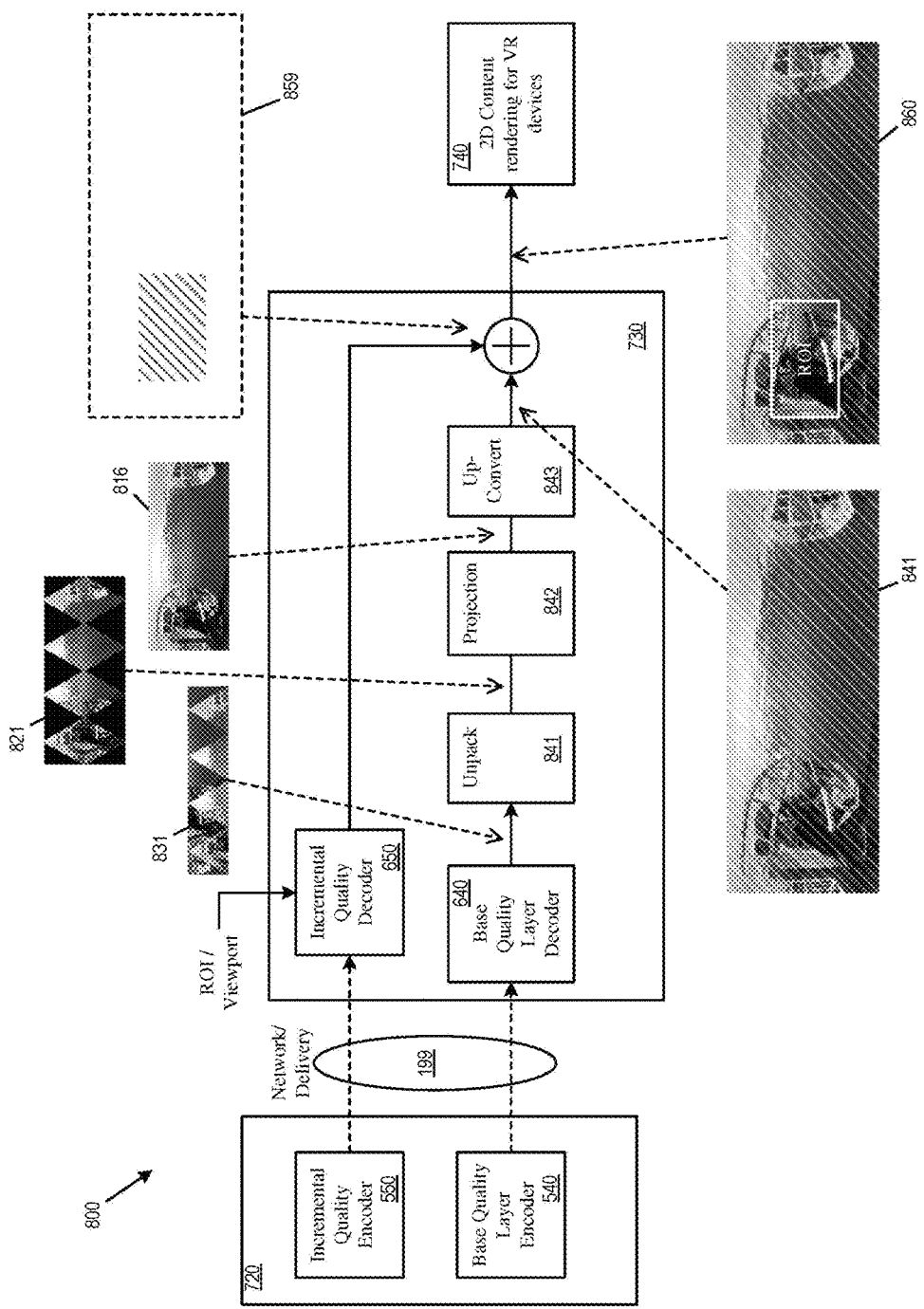

FIGS. 8a-b illustrate an implementation 800 of the VR content delivery system 700 that can be considered as an open-loop system. The VR content delivery system 800 includes the VR content delivery apparatus 720 and a VR content compositing apparatus 730. The VR content delivery apparatus 720 receives VR content 801 from the VR content provider 710, performs projection mapping and stitching (or packing) on the VR content before generating the base quality layer and the incremental quality layer for delivery and compositing at the VR content compositing apparatus 730.

The VR content delivery apparatus 720 includes the base quality layer encoder 540 and the incremental quality layer encoder 550. The encoders 540 and 550 are described by reference to FIG. 5 above. The VR content delivery apparatus 720 also includes projection mapping modules 810 and 815, a down-converter 820, an up-converter 825, a stitching (packing) module 830. In some embodiments, the modules 810, 820, 815, 825, 830, 540, 550 are modules of software instructions being executed by one or more processing units (e.g., a processor) of a computing device or electronic apparatus. In some embodiments, the modules 810, 820, 815, 825, 830, 540, 550 are modules of hardware circuits implemented by one or more integrated circuits (ICs) of an electronic apparatus. Though the modules 810, 820, 815, 825, 830, 540, 550 are illustrated as being separate modules, some of the modules can be combined into a single module.

As illustrated, the VR content 801 is in OHP mode. To produce the incremental quality layer 829, the VR content delivery apparatus 720 performs projection (at the projection module 810) to convert the VR content 801 from OHP to ERP to produce full-size ERP content 811. The VR content delivery apparatus 720 also down-converts (at the down-converter 820) the video content 801 to produce size-reduced OHP content 821. The apparatus projection maps (at the projection module 815) the size-reduced OHP content 821 from OHP to ERP to produce size-reduced ERP content 816. The size-reduced ERP content 816 is up-converted (at the up-converter 825) to produce an up-converted ERP content 826. The difference between the up-converted ERP content 826 and the full-size ERP content 811 is the incremental quality layer 829. The incremental quality layer encoder 550 encodes the incremental quality layer 829 for delivery across the IP network 199 to the VR content compositing apparatus 730.

To produce the base quality layer object 831, the VR content delivery apparatus 720 packages or stitches (at the packing module 830) the reduced OHP content 821 into a packed OHP content 831 to further reduce its size. The packed OHP content 831 serves as the base quality layer object. The base quality layer encoder 540 encodes the base quality layer 831 for delivery across the IP network 199 to the VR content compositing apparatus 730.

In the example of FIGS. 8*a-b*, the incremental quality layer is in ERP format while the base quality layer is in a packed OHP format. More generally, the base quality layer may be in a projection/packing format or mode that is more efficient in term of bit rate and storage size, while the incremental quality layer may be in projection/packing format that is friendlier to random access addressing due to arbitrary ROI/viewport selection. This is unlike the closed-loop implementation of FIG. 5 in which the VR content delivery apparatus 720 generates the incremental quality layer with the reconstructed base quality layer, and that the encoded base quality layer object and the encoded incremental quality layer object being delivered are in a same VR projection format.

The VR content composting apparatus 730 includes the base quality layer decoder 640 and the incremental quality layer decoder 650. The decoders 640 and 650 are described by reference to FIG. 6 above. The VR content compositing apparatus 730 also includes unpack module 841, projection modules 842, and up-converter 843. In some embodiments, the modules 841-843, 640, and 650 are modules of software instructions being executed by one or more processing units (e.g., a processor) of a computing device or electronic apparatus. In some embodiments, the modules 841-843, 640, and 650 are modules of hardware circuits implemented by one or more integrated circuits (ICs) of an electronic apparatus. Though the modules 841-843, 640, and 650 are illustrated as being separate modules, some of the modules can be combined into a single module.

The VR content compositing apparatus 730 receives and decodes (at the incremental quality layer decoder 650) the encoded incremental quality layer object 829 to generate the decoded incremental quality layer 859. In the illustrated example, the incremental quality layer decoder 650 receives a ROI/viewport specification so the decoded incremental quality layer 859 occupies only a portion of the omnidirectional presentation that corresponds to the ROI.

The VR content compositing apparatus 730 also receives and decodes (at the base quality layer decoder 640) the encoded base quality layer object 831. Since the base quality layer object is in a packed OHP format, the VR content compositing apparatus 730 unpacks (at unpack module 841), projection maps to ERP format (at projection module 842), and up-convert (at up-converter 843) the decoded base quality layer to generate an up-converted base quality layer 841.

The VR content compositing apparatus 730 composites the up-converted base quality layer 841 with the decoded incremental quality layer 859 to produce a composite VR presentation 860. As illustrated, when there is a ROI/viewport specification, the composite VR presentation has full quality within the ROI (shown without hash) and lower base quality outside of the ROI.

Though not illustrated, the encoded incremental quality layer and the encoded base quality layer are delivered with metadata that includes parameters on how should the base quality layer and incremental quality layer be decoded and composited (e.g., size, resolution, coding standard, conversion ratio, etc.). Since the open-loop implementation 800 performs projection mapping at the delivery side (the VR content delivery apparatus 720), the metadata also includes information specific to the formatting of the VR omnidirectional video/image, e.g., information on the projection format (e.g., whether it's ERP, OHP, CMP, EAP, or some other projection mapping format) and packing format (e.g., rearranging the different faces of platonic solid projection to reduce the size of omnidirectional images in 360VR media content).

IV. Metadata for Compositing Spatial Objects

As mentioned, the encoded media content being encoded as spatial objects for delivery and compositing is associated with metadata that includes parameters for at least some of the spatial objects as well as parameters characterizing the relationships between the spatial objects, regardless of the type of the spatial objects being transmitted (overlay objects, base and incremental quality layers, 360VR omnidirectional media content, etc.).

In some embodiments, the encoded spatial objects and the metadata are transmitted in data stream in accordance with Dynamic Adaptive Streaming over HTTP, also known as MPEG-DASH. MPEG-DASH is an adaptive bit rate streaming technique for delivering media content over the Internet from HTTP web servers. The information of the metadata maybe signaled as part of a Media Presentation Description (MPD) and/or a Spatial Relationship Description (SRD) of MPEG-DASH. The SRD scheme extends MPD by describing spatial relationships between associated pieces of video content. This enables the DASH client to select and retrieve only those video streams at those resolutions that are relevant to the user experience.

To signal the presence of base quality content (content of base quality layer), incremental quality content (content of incremental quality layer), and their relationships for MPEG DASH application, the metadata in some embodiments uses essential property descriptor or supplemental property descriptor of MPD to indicate the presence and the relationship of the base and incremental quality content. In some embodiments, the MPEG-DASH may be used to further indicate relative roles in the streaming and rendering process.

FIGS. 9*a-b* illustrate an example MPD 900 that signals presence and the relationships of the base and incremental quality content. In the example MPD, the variable "Switching Interval" may be set to a larger value for base quality content and set to a smaller value for incremental quality content. Table 1 below lists the parameters for indicating the presence and relationships of the base and incremental quality layer content in Essential Property and/or Supplemental Property of MPD:

TABLE 1

| @value parameter | Description |
| --- | --- |
| baseQualityContentId | The Adaptation Set Id that contains the base quality content in a Period. |
| contentBaseIncrementalIdPairList | Comma separated list in pair of the Representation Ids in AdaptationSet@baseQualityContentId and Adaptation Set Ids of the corresponding incremental content. |
| baseQualityConversionRatio | The down-conversion ratio for the base quality content from the original content source, e.g. 2 for 2:1. |

In some embodiments, tile-based encoding technique may be used for both the base quality content and the incremental quality content. FIG. 10 illustrates an example MPD 1000 in which the incremental quality content is encoded as HEVC tiles.

In some embodiments in which the base quality content and the incremental quality content are for compositing a 360VR presentation, the metadata uses essential property descriptor or supplemental property descriptor of MPD to also indicate information specific to VR presentation, such as projection format and packing format (in addition to indicating the presence and the relationship of the base and incremental quality layers).

FIG. 11 is an example MPD 1100 in which the projection and packing format for VR projection are indicated. Specifically, the example MPD 1100 indicates a base quality layer in CMP projection format and 2×3 packing format and an incremental quality layer in ERP format. The down-conversion ratio is 2 for the base quality layer both in horizontal and vertical directions.

Table 2 below lists parameters for indicating the presence and relationships of the base quality content and incremental quality content, as well projection and packing format in the variable "value" of Essential Property and/or Supplemental Property.

TABLE 2

| @value parameter | Description |
| --- | --- |
| baseLayerId | The Adaptation Set Id that contains the base quality content in a Period. |
| baseLayerProjPack | Comma separated list in pair of the Representation Ids in AdaptationSet@baseQualityContentId andAdaptation Set Ids of the corresponding incremental content. |
| incLayerId | The down-conversion ratio for the base quality content from the original content source, e.g. 2 for 2:1. |
| incLayerFaceId | Id of the projected face, per CICP. |
| baseLayerConversionRatio | Comma separated down-conversion ratio for the base quality layer from the original content source, e.g. 2,2 for 2:1 in both horizontal and vertical direction. |

Some embodiments of the present disclosure provide a dynamic SRD scheme that includes blending modes for compositing spatial objects. The blending information may be carried as parameter sofa 2D Cartesian coordinates sample. The blending information may also be carried as a 2D Cartesian coordinates sample. The additional parameters for blending 2D Cartesian coordinates sample can be set to 0 or omitted from the dynamic SRD scheme.

FIG. 12 illustrates the syntax of an example 2D Cartesian coordinate sample that carries blending information as parameters. Specifically, the 2D Cartesian coordinate sample includes an indicator "blend" followed by a parameter "blending_mode" if the indicator "blend" is true. The indicator "blend" indicates blending information is present. When true, applications may use the blending modes and the reserved corresponding parameter values listed in Table 3 below. The spatial object associated with the blending information will be treated as the top layer spatial object(s) during compositing processing over spatial objects underneath.

TABLE 3

| Value | Blending mode | Description |
| --- | --- | --- |
| 1 | Normal | Uses the top layer alone, without mixing its colors with the layer beneath it. |
| 2 | Dissolve | Take random pixels from both layers |
| 3 | Multiply | Multiply the number of each pixel of the top layer with the corresponding pixel for the bottom layer |
| 4 | Screen | The values of the pixels in the two layers are inverted, multiplied, and then inverted again. |
| 5 | Overlay | Combines Multiply and Screen blend modes |
| 6 | Addition | Adds pixel values of one layer with the other. In case of values above 1, (1 is white), white is displayed |
| 7 | Subtract | Subtract pixel values of one layer with the other. In case of negative values, black is displayed (0 is black) |
| 8 | Difference | Subtracts the bottom layer from the top layer or the other way around, to always get a positive value. |

Table 3 shows example parameter values for various possible blending modes. (In the example table, the described spatial object is considered as the top layer object.)

Table 4 below lists parameters of Essential Property and/or Supplemental Property of SRD scheme in MPD when 2D Cartesian coordinate samples carry blending information.

TABLE 4

| @value parameter | Description |
| --- | --- |
| Source_id | Non-negative integer in decimal representation providing the identifier for the source of the content |
| Coordinate_id | Specifies the @id attribute of the Representation that provides the 2D coordinates of the Spatial Object and blending information for the Spatial Object, e.g. as timed metadata track according to ISO/IEC 23001-10. |
| Spatial_set_id | Optional non-negative integer in decimal representation providing an identifier for a group of Spatial Object. When not present, the Spatial Object associated to this descriptor does not belong to any spatial set and no spatial set information is given. |
| Blending_coordinate_id | Optionally specifies the @id attribute of the Representation that provides blending information for the 2D coordinates of the Spatial Object with coordinate_id for Spatial Object with spatial_set_id. When the value of coordinate_id is present, the value of spatial_set_id shall be present. |

FIG. 13 illustrates an example MPD 1300 that uses 2D Cartesian coordinate sample that carries blending information as parameters. As the additional parameters are added in the existing 2D Cartesian coordinates sample, there is only one timed metadata track. In the example MPD, the blending information is loaded in from "roi_coordinates_blending.mp4" as parameters of 2D Cartesian coordinates samples.

In some embodiments, 2D Cartesian coordinates samples are generated along with the content before being applied to a specific application. The blending information may be generated separately afterwards for the specific application. In some embodiments, such blending information is stored as 2D Cartesian coordinate samples. For some embodiments, FIG. 14 illustrates the syntax of a 2D Cartesian coordinate sample that is used to store blending information. The syntax element "2dccsample" is optional if the 2D Cartesian coordinate sample is presented in a separate metadata track or file. FIG. 15 illustrates an example MPD 1500 that uses blending information stored as 2D Cartesian coordinate samples. In the example MPD, the blending information is loaded in from "blending_roi_coordinates.mp4" as 2D Cartesian coordinates samples.

In some embodiments, the syntax of SRD includes support of simultaneous feature and parallel computing in a DASH client device (e.g., enabling simultaneous processing by base quality layer decoder 640 and the incremental quality layer decoder 650 in the scalable video decoder 600 or in the VR content compositing apparatus 730). Enabling parallel computing allows, for example, tiled video from a frame or panorama view being presented/displayed simultaneously on one or more devices. The use of tile sizes may be independent of client devices. The interactivity among spatial objects such as mix or blending may be allowed and defined to improve overall content coding/delivery efficiency. Enabling parallel computing therefore enriches various VR presentations on one or more devices.

In some embodiments, signaling adaptation set in an SRD indicates that the adaptation set may be identified by the viewpoint element if present, or it may be identified as a sub-asset of an asset by an extended sub-asset identifier scheme. As an option, adaptation sets with equivalent view point value or equivalent sub-asset value may, or shall, be presented together according to the corresponding SRD information, depending on whether it is used in a SupplementalProperty or EssentialProperty.

In some embodiments, the SRD includes a scheme identifier for enabling simultaneous presentation or parallel processing. FIG. 16 illustrates an example MPD 1600 with SRD scheme that enables simultaneous presentations.

Upon receiving the example MPD 1600, a client that is not SRD-aware would present mainly the left panorama, or the right panorama, or both panorama. On the other hand, a client that is SRD-aware upon receiving the example MPD 160 would present, on a single device or multiple devices, a zoomed view, or one zoomed view with one panorama view, or one zoomed view with two panorama views. In some embodiments, the panorama view is used as the base quality layer for VR application, and the tiled or zoomed view is used as the incremental quality layer based on client viewport/ROI change.

MPEG-DASH defines "asset" as "content including media and metadata together with the rights to use the content by the content provider", and "sub-asset" as "media content component (or part thereof) identified as corresponding to a part of an asset". Sub-asset identifier scheme of SRD specifies the temporal feature typically relating to playback continuity. In some embodiments, the sub-asset identifier scheme of SRD is extended to specify the spatial feature as well. For example, if a tile based full video (frame) content is defined as an asset, then those tiles compositing the full video content can be identified by the descriptor of the sub-asset identifier scheme. This extension may also be used for tile based encoding and delivery for VR applications such that tiles with the same sub-asset value may be played back together and be presented (with SRD information) as the full video content. In some embodiments, the sub-asset Identifier scheme is further extended to describe spatial relationships between spatial objects being composited.

In some embodiments, sub-assets across adaptation sets within a period can be identified using a sub-asset scheme identifier. If two different adaptation sets or sub-representation from a period contain sub-asset identifiers descriptors with the same "value" attribute, then the content in the representation(s) contained in these adaptation sets represent spatial parts (or spatial objects) of the same asset. The represented spatial parts may come with SRD descriptors. DASH clients may also use sub-asset identifier descriptor to select representation(s) to be processed simultaneously within a period for composing a full spatial presentation.

FIGS. 17a-b illustrate an example MPD 1700 that uses sub-asset scheme to signal spatial objects or spatial parts of a composite presentation. In the example MPD 1700, an adaptation set signaled with a SRD scheme, schemeIdUri="urn:mpeg:dash:srd:simul:2017", maybe a sub-asset of an asset. It may also be identified by the extended sub-asset identifier scheme, schemeIdUri="urn:mpeg:dash:sai:spatial:2017". If they have an equivalent sub-asset value, the client may elect to present them together, according to the corresponding SRD schemes.

In addition to using "urn:mpeg:dash:sai:2017" as a scheme for identifying sub assets in temporal domain and using "urwmpeg:dash:sai:spatial:2017" as a scheme for identifying sub assets in spatial domain, the sub-asset identifier scheme may be further extended as "urn:mpeg:dash:sai:signal:2017" to cover broader cases for various application optimizations. For example, a sub-asset may be a color component of a full color asset, or a partial signal of a full signal range asset, etc. A rich blending scheme may be used together with it for a good overall quality of experience.

V. Example Video Encoder

Figure 18:
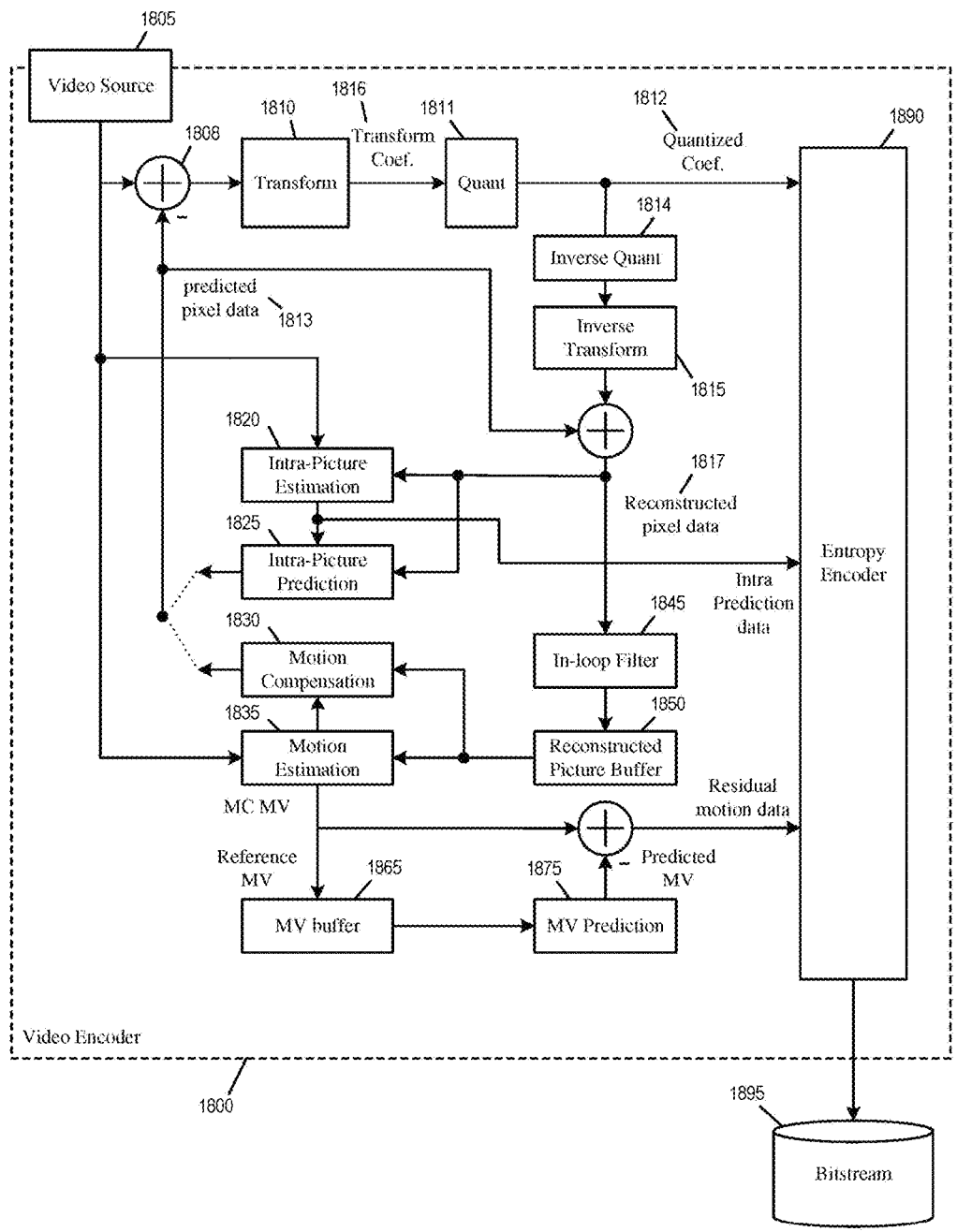
FIG. 18 illustrates an example video encoder.

FIG. 18 illustrates an example video encoder 1800 that implements at least some of the media encoders 111-119 in the media content delivery apparatus 100.

As illustrated, the video encoder 1800 receives input video signal from a video source 1805 and encodes the signal into bitstream 1895. The video encoder 1800 has several components or modules for encoding the video signal 1805, including a transform module 1810, a quantization module 1811, an inverse quantization module 1814, an inverse transform module 1815, an intra-picture estimation module 1820, an intra-picture prediction module 1825, a motion compensation module 1830, a motion estimation module 1835, an in-loop filter 1845, a reconstructed picture buffer 1850, a MV buffer 1865, and a MV prediction module 1875, and an entropy encoder 1890.

In some embodiments, the modules 1810-1890 are modules of software instructions being executed by one or more processing units (e.g., a processor) of a computing device or electronic apparatus. In some embodiments, the modules 1810-1890 are modules of hardware circuits implemented by one or more integrated circuits (ICs) of an electronic apparatus. Though the modules 1810-1890 are illustrated as being separate modules, some of the modules can be combined into a single module.

The video source 1805 provides a raw video signal that presents pixel data of each video frame without compression. A subtractor 1808 computes the difference between the raw video pixel data of the video source 1805 and the predicted pixel data 1813 from motion compensation 1830 or intra-picture prediction 1825. The transform 1810 converts the difference (or the residual pixel data) into transform coefficients (e.g., by performing Discrete Cosine Transform, or DCT). The quantizer 1811 quantized the transform coefficients into quantized data (or quantized coefficients) 1812, which is encoded into the bitstream 1895 by the entropy encoder 1890.

The inverse quantization module 1814 de-quantizes the quantized data (or quantized coefficients) 1812 to obtain transform coefficients, and the inverse transform module 1815 performs inverse transform on the transform coefficients to produce reconstructed pixel data 1817 (after adding prediction pixel data 1813). In some embodiments, the reconstructed pixel data 1817 is temporarily stored in a line buffer (not illustrated) for intra-picture prediction and spatial MV prediction. The reconstructed pixels are filtered by the in-loop filter 1845 and stored in the reconstructed picture buffer 1850. In some embodiments, the reconstructed picture buffer 1850 is a storage external to the video encoder 1800. In some embodiments, the reconstructed picture buffer 1850 is a storage internal to the video encoder 1800.

The intra-picture estimation module 1820 performs intra-prediction based on the reconstructed pixel data 1817 to produce intra prediction data. The intra-prediction data is provided to the entropy encoder 1890 to be encoded into bitstream 1895. The intra-prediction data is also used by the intra-picture prediction module 1825 to produce the predicted pixel data 1813.

The motion estimation module 1835 performs inter-prediction by producing MVs to reference pixel data of previously decoded frames stored in the reconstructed picture buffer 1850. These MVs are provided to the motion compensation module 1830 to produce predicted pixel data. These MVs are also necessary for reconstructing video frame at the single-channel decoding system. Instead of encoding the complete actual MVs in the bitstream, the video encoder 1800 uses temporal MV prediction to generate predicted MVs, and the difference between the MVs used for motion compensation and the predicted MVs is encoded as residual motion data and stored in the bitstream 1895 for the single-channel decoding system.

The video encoder 1800 generates the predicted MVs based on reference MVs that were generated for encoding previously video frames, i.e., the motion compensation MVs that were used to perform motion compensation. The video encoder 1800 retrieves reference MVs from previous video frames from the MV buffer 1865. The video encoder 1800 stores the MVs generated for the current video frame in the MV buffer 1865 as reference MVs for generating predicted MVs.

The MV prediction module 1875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1895 by the entropy encoder 1890.

The entropy encoder 1890 encodes various parameters and data into the bitstream 1895 by using entropy-coding techniques such as context-adaptive binary arithmetic coding (CABAC) or Huffman encoding. The entropy encoder 1890 encodes parameters such as quantized transform data and residual motion data into the bitstream.

The in-loop filter 1845 performs filtering or smoothing operations on the reconstructed pixel data 1817 to reduce the artifacts of coding, particularly at boundaries of pixel blocks. In some embodiments, the filtering operation performed includes sample adaptive offset (SAO). In some embodiment, the filtering operations include adaptive loop filter (ALF).

VI. Example Video Decoder

Figure 19:
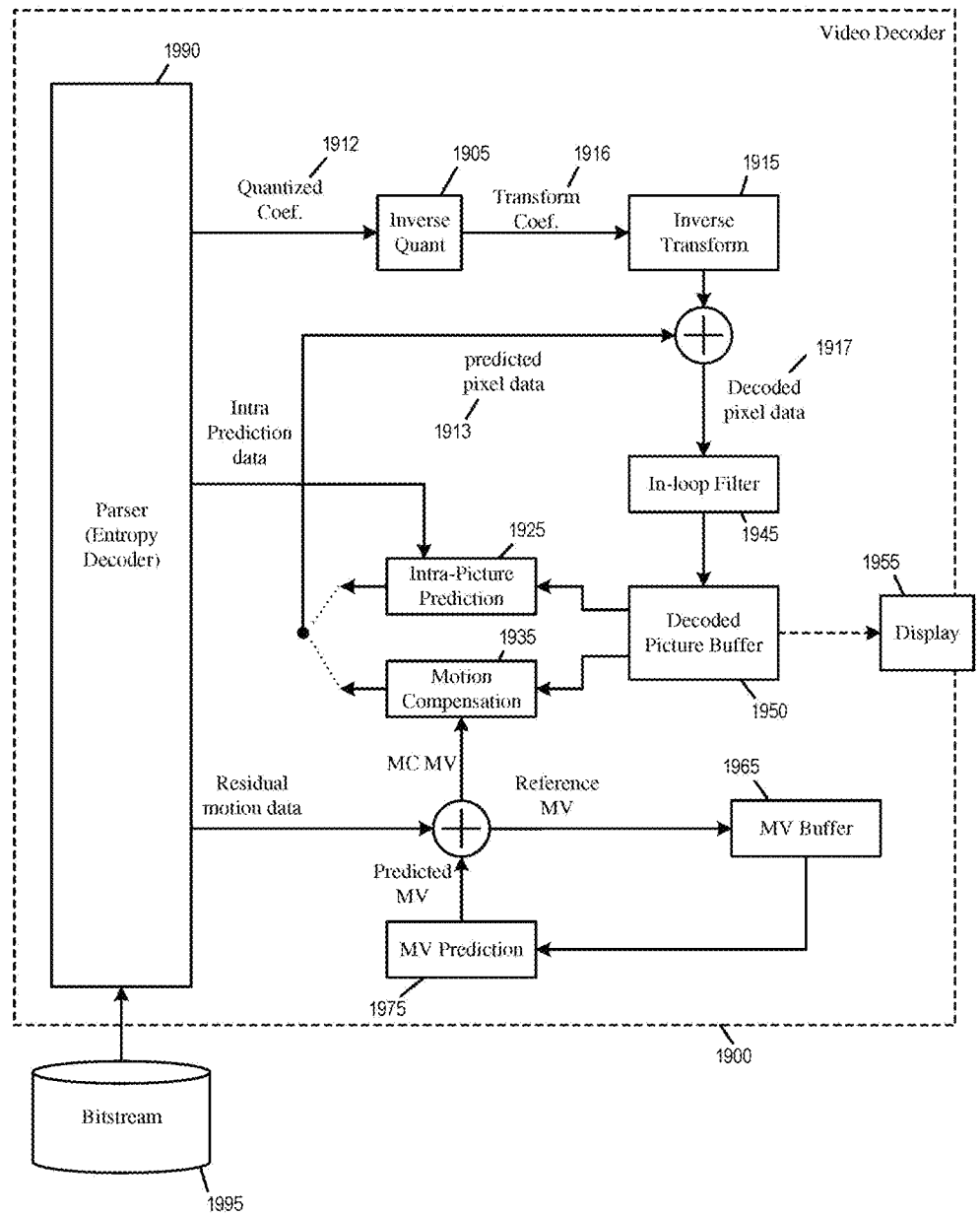
FIG. 19 illustrates an example video decoder.

FIG. 19 illustrates an example video decoder 1900 that implements at least some of the media decoders 211-219 in the media content compositing apparatus 200.

As illustrated, the video decoder 1900 is an image-decoding or video-decoding circuit that receives a bitstream 1995 and decodes the content of the bitstream into pixel data of video frames for display. The video decoder 1900 has several components or modules for decoding the bitstream 1995, including an inverse quantization module 1905, an inverse transform module 1915, an intra-picture prediction module 1925, a motion compensation module 1935, an in-loop filter 1945, a decoded picture buffer 1950, a MV buffer 1965, a MV prediction module 1975, and a bitstream parser 1990.

In some embodiments, the modules 1910-1990 are modules of software instructions being executed by one or more processing units (e.g., a processor) of a computing device. In some embodiments, the modules 1910-1990 are modules of hardware circuits implemented by one or more ICs of an electronic apparatus. Though the modules 1910-1990 are illustrated as being separate modules, some of the modules can be combined into a single module.

The parser 1990 (or entropy decoder) receives the bitstream 1995 and performs initial parsing according to the syntax defined by a video-coding or image-coding standard. The parsed syntax element includes various header elements, flags, as well as quantized data (or quantized coefficients) 1912. The parser 1990 parses out the various syntax elements by using entropy-coding techniques such as context-adaptive binary arithmetic coding (CABAC) or Huffman encoding.

The inverse quantization module 1905 de-quantizes the quantized data (or quantized coefficients) 1912 to obtain transform coefficients, and the inverse transform module 1915 performs inverse transform on the transform coefficients 1916 to produce decoded pixel data 1917 (after adding prediction pixel data 1913 from the intra-prediction module 1925 or the motion compensation module 1935). The decoded pixels data are filtered by the in-loop filter 1945 and stored in the decoded picture buffer 1950. In some embodiments, the decoded picture buffer 1950 is a storage external to the video decoder 1900. In some embodiments, the decoded picture buffer 1950 is a storage internal to the video decoder 1900.

The intra-picture prediction module 1925 receives intra-prediction data from bitstream 1995 and according to which, produces the predicted pixel data 1913 from the decoded pixel data 1917 stored in the decoded picture buffer 1950. In some embodiments, the decoded pixel data 1917 is also stored in a line buffer (not illustrated) for intra-picture prediction and spatial MV prediction.

In some embodiments, the content of the decoded picture buffer 1950 is used for display. A display device 1955 either retrieves the content of the decoded picture buffer 1950 for display directly, or retrieves the content of the decoded picture buffer to a display buffer. In some embodiments, the display device receives pixel values from the decoded picture buffer 1950 through a pixel transport.

The motion compensation module 1935 produces predicted pixel data 1913 from the decoded pixel data 1917 stored in the decoded picture buffer 1950 according to motion compensation MVs (MC MVs). These motion compensation MVs are decoded by adding the residual motion data received from the bitstream 1995 with predicted MVs received from the MV prediction module 1975.

The video decoder 1900 generates the predicted MVs based on reference MVs that were generated for decoding previous video frames, e.g., the motion compensation MVs that were used to perform motion compensation. The video decoder 1900 retrieves the reference MVs of previous video frames from the MV buffer 1965. The video decoder 1900 also stores the motion compensation MVs generated for decoding the current video frame in the MV buffer 1965 as reference MVs for producing predicted MVs.

The in-loop filter 1945 performs filtering or smoothing operations on the decoded pixel data 1917 to reduce the artifacts of coding, particularly at boundaries of pixel blocks. In some embodiments, the filtering operation performed includes sample adaptive offset (SAO). In some embodiment, the filtering operations include adaptive loop filter (ALF).

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 20:
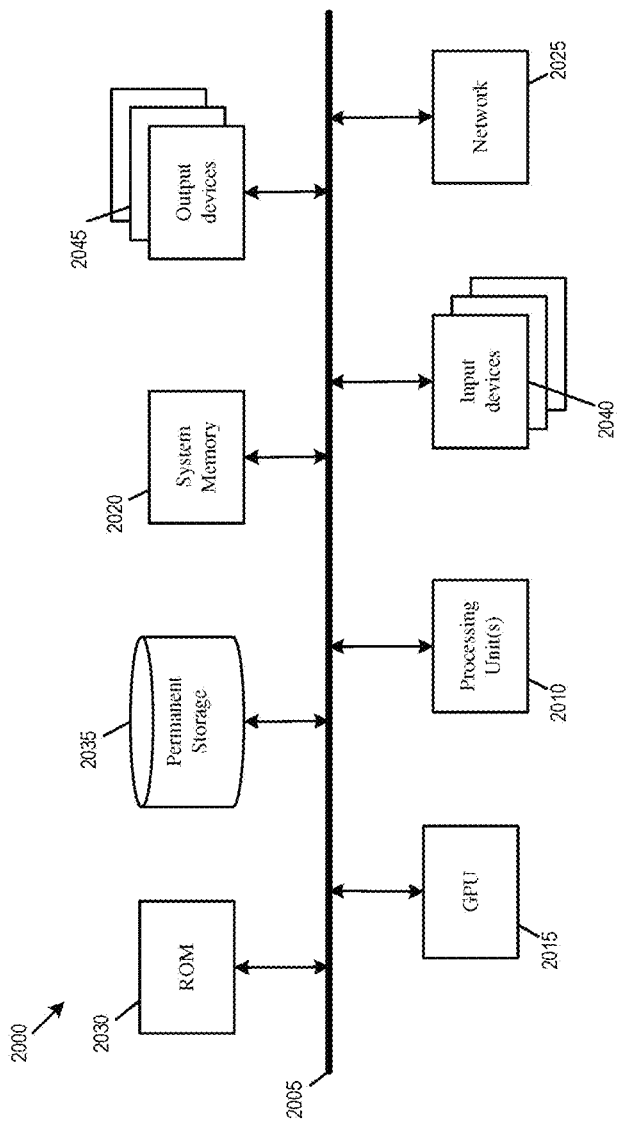
FIG. 20 conceptually illustrates an electronic system with which some embodiments of the present disclosure are implemented.

FIG. 20 conceptually illustrates an electronic system 2000 with which some embodiments of the present disclosure are implemented. The electronic system 2000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2000 includes a bus 2005, processing unit(s) 2010, a graphics-processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the GPU 2015, the read-only memory 2030, the system memory 2020, and the permanent storage device 2035.

From these various memory units, the processing unit(s) 2010 retrieves instructions to execute and data to process in order to execute the processes of the present disclosure. The processing unit(s) may be a single processor or a multi-core processor in different embodiments. Some instructions are passed to and executed by the GPU 2015. The GPU 2015 can offload various computations or complement the image processing provided by the processing unit(s) 2010.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the present disclosure use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2020 is a read-and-write memory device. However, unlike storage device 2035, the system memory 2020 is a volatile read-and-write memory, such a random-access memory. The system memory 2020 stores some of the instructions and data that the processor needs at runtime. In some embodiments, processes in accordance with the present disclosure are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alpha-numeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 3-4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method comprising:
encoding one or more first spatial objects at one or more first component layers of a composite representation;
encoding a second spatial object at a second component layer over the one or more first component layers of the composite representation, each one of the one or more first spatial objects and the second spatial object being encoded independently;
generating metadata that includes coordinate information indicating a position of the second spatial object and blending information specifying one of a plurality of predetermined blending operations for blending the second spatial object with a bottom layer image derived according to the one or more first spatial objects in the composite representation, wherein the plurality of predetermined blending operations include:
a normal mode operation corresponding to placing the second spatial object over the bottom layer image without mixing samples of the second spatial object with corresponding samples of the bottom layer image, and
an addition mode operation corresponding to adding the samples of the second spatial object to the corresponding samples of the bottom layer image; and
assembling the encoded one or more first spatial objects, the encoded second spatial object, and the generated metadata as a data stream for transmission or a data file for storage.

2. The method of claim 1, wherein
the one or more first spatial objects are encoded according to a first video/image coding standard, and
the second spatial object is encoded according to a second, different video/image coding standard.

3. The method of claim 1, wherein the second spatial object is encoded by intra-coding without inter-prediction-coding.

4. The method of claim 1, wherein
the one or more first spatial objects include a base quality layer object that is down-converted from an original image, and
the second spatial object is an incremental quality layer object that is derived by
(i) reconstructing the base quality layer object from an encoded base quality layer object,
(ii) up-converting the reconstructed base quality layer object to a particular resolution, and
(iii) computing a difference between the up-converted reconstructed base quality layer object and the original image at the particular resolution.

5. The method of claim 4, wherein the metadata comprises a down-conversion ratio of the down-conversion of the base quality layer from the original image.

6. The method of claim 1, wherein
the one or more first spatial objects include a base quality layer object of a composite omnidirectional image,
the second spatial object is an incremental quality layer object of the composite omnidirectional image, and
the base quality layer object is in a first projection mode and the incremental quality layer object is in a second, different projection mode.

7. The method of claim 6, wherein the metadata includes one or more parameters specifying the first projection mode, the second projection mode, and a packing mode of the base quality layer object.

8. The method of claim 1, wherein the metadata includes identification information specifying the one or more first spatial objects and the second spatial object as sub-assets of media content in a spatial domain.

9. The method of claim 1, wherein the metadata includes an indicator indicating whether the blending information associated with the second spatial object is included in the metadata.

10. An electronic apparatus comprising:
one or more hardware circuits configured to:
encode one or more first spatial objects at one or more first component layers of a composite representation;
encode a second spatial object at a second component layer over the one or more first component layers of the composite representation, each one of the one or more first spatial object and the second spatial object being encoded independently;
generate metadata that includes coordinate information indicating a position of the second spatial object and blending information specifying one of a plurality of predetermined blending operations for blending the second spatial object with a bottom layer image derived according to the one or more first spatial objects in the composite representation, wherein the plurality of predetermined blending operations include:
a normal mode operation corresponding to placing the second spatial object over the bottom layer image without mixing samples of the second spatial object with corresponding samples of the bottom layer image, and
an addition mode operation corresponding to adding the samples of the second spatial object to the corresponding samples of the bottom layer image; and
assemble the encoded one or more first spatial objects, the encoded second spatial object, and the generated metadata as a data stream for transmission or a data file for storage.

11. An electronic apparatus comprising:
one or more hardware circuits configured to:
receive a data stream or a data file,
obtain, from the data stream or the data file, one or more first spatial objects at one or more first component layers of a composite representation;
obtain, from the data stream or the data file, a second spatial object at a second component layer over the one or more first component layers of the composite representation, each one of the one or more first spatial objects and the second spatial object being decoded independently;

obtain, from the data stream or the data file, metadata that includes coordinate information indicating a position of the second spatial object and blending information specifying one of a plurality of predetermined blending operations for blending the second spatial object with a bottom layer image derived according to the one or more first spatial objects in the composite representation, wherein the plurality of predetermined blending operations include:

a normal mode operation corresponding to placing the second spatial object over the bottom layer image without mixing samples of the second spatial object with corresponding samples of the bottom layer image, and an addition mode operation corresponding to adding the samples of the second spatial object to the corresponding samples of the bottom layer image; and render the composite representation for output, including performing the operation for blending the second spatial object with the one or more first spatial objects according to the blending information.

12. A method comprising:

receiving a data stream or a data file;

obtaining, from the data stream or the data file, one or more first spatial objects at one or more first component layers of a composite representation;

obtaining, form the data stream or the data file, a second spatial object at a second component layer over the one or more first component layers of the composite representation, each one of the one or more first spatial objects and the second spatial object being decoded independently;

obtaining, from the data stream or the data file, metadata that includes coordinate information indicating a position of the second spatial object and blending information specifying one of a plurality of predetermined blending operations for blending the second spatial object with a bottom layer image derived according to the one or more first spatial objects in the composite representation, wherein the plurality of predetermined blending operations include:

a normal mode operation corresponding to placing the second spatial object over the bottom layer image without mixing samples of the second spatial object with corresponding samples of the bottom layer image, and an addition mode operation corresponding to adding the samples of the second spatial object to the corresponding samples of the bottom layer image; and rendering the composite representation, including performing the operation for blending the second spatial object with the one or more first spatial objects according to the blending information.

13. The method of claim 12, wherein the one or more first spatial objects are decoded according to a first video/image coding standard, and the second spatial object is decoded according to a second, different video/image coding standard.

14. The method of claim 12, wherein the one or more first spatial objects include a base quality layer object, the second spatial object is an incremental quality layer object, and the rendering the composite representation further comprises up-converting the base quality layer object to a particular resolution derived from the metadata.

15. The method of claim 14, wherein the metadata comprises a conversion ratio, the up-converting the base quality layer object being performed according to the conversion ratio.

16. The method of claim 12, wherein the one or more first spatial objects include a base quality layer object of a composite omnidirectional image, the second spatial object is an incremental quality layer object of the composite omnidirectional image, and the base quality layer object is in a first projection mode and the incremental quality layer object is in a second, different projection mode.

17. The method of claim 12, wherein the one or more first spatial objects include a base quality layer object, the second spatial object is an incremental quality layer object, and the rendering the composite representation comprises processing and presenting the base quality layer object and the incremental quality layer object simultaneously when the metadata comprises a parameter indicating that the base quality layer object and the incremental quality layer object are to be processed for simultaneous presentation.

18. The method of claim 12, wherein the metadata includes identification information specifying the one or more first spatial objects and the second spatial object as sub-assets of media content in a spatial domain.

19. The method of claim 12, wherein the composite presentation is a virtual reality (VR) video for a VR device based on omnidirectional images, and the second spatial object is partially fetched according to a region of interest (ROI) selection from the VR device.

* * * * *